United States Patent [19]

Karbowiak et al.

[11] Patent Number: 4,663,748
[45] Date of Patent: May 5, 1987

[54] LOCAL AREA NETWORK

[75] Inventors: Antoni E. Karbowiak; Gary J. Anido, both of Sydney, Australia

[73] Assignee: Unisearch Limited, Kensington, Australia

[21] Appl. No.: 720,880

[22] Filed: Apr. 8, 1985

[30] Foreign Application Priority Data

Apr. 12, 1984 [AU] Australia ............................. PG4548

[51] Int. Cl.⁴ ............................ H04J 3/02; H04J 3/16
[52] U.S. Cl. ........................................ 370/89; 370/86; 340/825.5
[58] Field of Search ....................... 370/85, 86, 89, 15, 370/16, 88, 90; 340/825.05, 825.5, 825.51

[56] References Cited

U.S. PATENT DOCUMENTS

| Re. 28,811 | 5/1976 | Pierce | 370/88 |
| 4,154,983 | 5/1979 | Pedersen | 370/89 |
| 4,251,880 | 2/1981 | Baugh et al. | 370/86 |
| 4,380,061 | 4/1983 | Mori et al. | 370/88 |
| 4,482,999 | 11/1984 | Janson et al. | 370/89 |

OTHER PUBLICATIONS

Allan, R., "Network Developments Taking Different Routes", Electronic Design, Jun. 9, 1983, pp. 49–50.
Avellaneda, O. A., "A Capacity Allocation Problem in Voice-Data Networks", IEEE Trans. on Comm., vol. COM-30, No. 7, Jul. 1982, pp. 1767–1772.
Bux, W., "A Local-Area Communication Network Based on a Reliable Token-Ring System," Local Comp. Nets., IFIP, 1982, pp. 69–82.
Keller, H. J., "Transmission Design Criteria for a Synchronous Token Ring," IEEE J. on Sel. Areas in Comm., vol. SAC-1, No. 5, Nov. 83, pp. 721–733.
Mueller, H. R., "Transmission in a Synchronous Token Ring", Local Comp. Nets., IFIP, 1982, pp. 125–147.
Gordon, R. L., "Ringnet: A Packet Switched Local Network with Decentralised Control," IEEE 4th Conf. on Local Area Networks, Oct. 79, pp. 13–19.
Ishizaka, M., "A Link Level Protocol and its Firmware Implementation in a Ring Network," IEEE 6th Conf. on Local Computer Networks, 10/81, pp. 43–51.
Kropfl, W. J., "An Experimental Data Block Switching System: B.S.T.J., vol. 51, No. 6, Jul.–Aug. 1972, pp. 1147–1165.
Pierce, J. R., "Network for Block Switching of Data," B.S.T.J., vol. 51, No. 6, Jul.–Aug. 1972, pp. 1133–1145.
Ulm., J. M., "A Timed Token Ring Local Area Network and its Performance Characteristics," IEEE 7th Conf. on Local Computer Networks, 10/11–13/82, pp. 50–56.
Costlow, T., "Token-Passing Net for Offices Goes Broadband to Add Voice and Data", Electronic Design, May 12, 1983, p. 42.

Primary Examiner—Douglas W. Olms
Assistant Examiner—Wellington Chin
Attorney, Agent, or Firm—Holman & Stern

[57] ABSTRACT

A communications system suitable for use as a local area network (LAN) is provided wherein the network has a ring topology comprising a plurality of nodes 10 each of which is connected to adjacent nodes by links 14 and 15. Each node comprises a Link Interface Unit (LIU) 11, a Network Interforce Unit (NIU) 12 and a Terminal Interface Unit (TIU) 13. By providing forward and reverse links 14, 15 between nodes the system is capable of reconfiguring itself after link or node failure such that the failed equipment can be bypassed to minimize system disruption. Link Interface Units (LIU) 11 are also capable of bypassing their own node if a node failure is detected. System control is decentralized with each active node contributing to system control such that prime-failure sites are avoided. System protocol depends upon a token passing scheme where only the node 10 currently holding the token is entitled to transmit data and once it has finished its transmission the node 10 passes the token to the next node 10 in the ring. The system operates under a strict timing regime wherein a system cycle of substantially fixed period is established and the first rotation of the token around the ring during the system cycle is used to initiate transmission of the highest priority data with subsequent rotations of the token initiating transmission of data of progressively lower priorities. Accordingly, the timeslots available for transmission of each data type have variable-boundaries determined by the system load.

19 Claims, 29 Drawing Figures

J = JUNCTION VOICE TRAFFIC
L = LOCAL VOICE TRAFFIC
D = DATA TRAFFIC

LOCAL AREA NETWORK

The present invention relates to a digital communications system which allows the communication of a plurality of data types over a single communication channel, and in particular the invention relates to a system having a ring topology wherein controlled access to the system is provided by using a scheme of token passing to enable a mixture of voice and data traffic to be transmitted over the system while maintaining channel efficiency at a high level.

The present invention consists in a digital communications system comprising a plurality of nodes connected in a ring topology for transmission of information in one direction around said ring, each station in turn initiating transmission of information which it is waiting to transmit over the system in response to receipt of a token passed from station to station around the ring, said token being in the form of a unique digital code, and said communications system being adapted to carry at least two classes of information, each one of which is assigned a priority ranking and at least one of which is synchronous information for which the transmitting node must be serviced periodically, means being provided within the system whereby a new system transmission cycle is commenced at regular time intervals, and each node operating under a protocol whereby a first pass of the token around the ring during a system cycle is used to transmit synchronous information of the highest priority ranking, while subsequent passes of the token around the ring are used to transmit any remaining information classes in order of priority ranking, and time taken for each pass of the token around the ring being dependent upon the number of nodes having information of the respective class queued for transmission.

Preferably, the system will provide long and short system cycles, the short cycles being embedded in the long cycles such that the period for service of information classes of the highest priorities will be dictated by the short system cycle period while lower priority information will have a service period dictated by the long system cycle period. It is also possible to have more than two embedded system cycle periods to accomodate the differing requirements of various classes of information.

In the present embodiment, the short system cycle period is 4 ms to provide acceptable echo characteristics for digital voice transmissions from the system of the present invention to the Public Switched Telephone Network (PSTN), whereas a long system cycle period is 16 ms to optimise digitilised voice transmission within the present system. With these cycle times, digitalised signals which are transmitted once per short cycle period are packetised into packets having in the order of 256 bits whereas digitilised voice signals which are transmitted once per long cycle period are packetized into packets having in the order of 1024 bits.

Preferably the digital communications system will have distributed link-control, whereby each node participates in maintenance of the system control scheme. Accordingly, in the preferred embodiment, each node of the system is provided with timing means to time the length of successive system cycles and is adapted to initiate a new system cycle if it receives the token while the current system cycle has been running for more than a predetermined period of time.

The preferred embodiment also employs speech interpolation whereby the bandwidth requirement per speech channel is substantially reduced.

Preferably, the ring topology is a double ring wherein forward and reverse links are provided between each adjacent pair of nodes, such that in the event of a failure of a link between two adjacent nodes, the connection between the separated nodes can be re-established by passing the signal back along the reverse links of the ring. In the preferred embodiment the forward and reverse link pairs are also used to provide mutual clock synchronisation between adjacent nodes of the ring.

An embodiment of the present invention will now be described, by way of example, with reference to the accompanying drawings in which:

FIG. 1 schematically illustrates the switch architecture of a communications system according to the present invention;

FIG. 2 schematically illustrates the method by which the architecture of FIG. 1 is adapted to recover from link failure;

FIG. 3 schematically illustrates the method by which the architecture of FIG. 1 is adapted to recover from the node failure;

Figure 1:
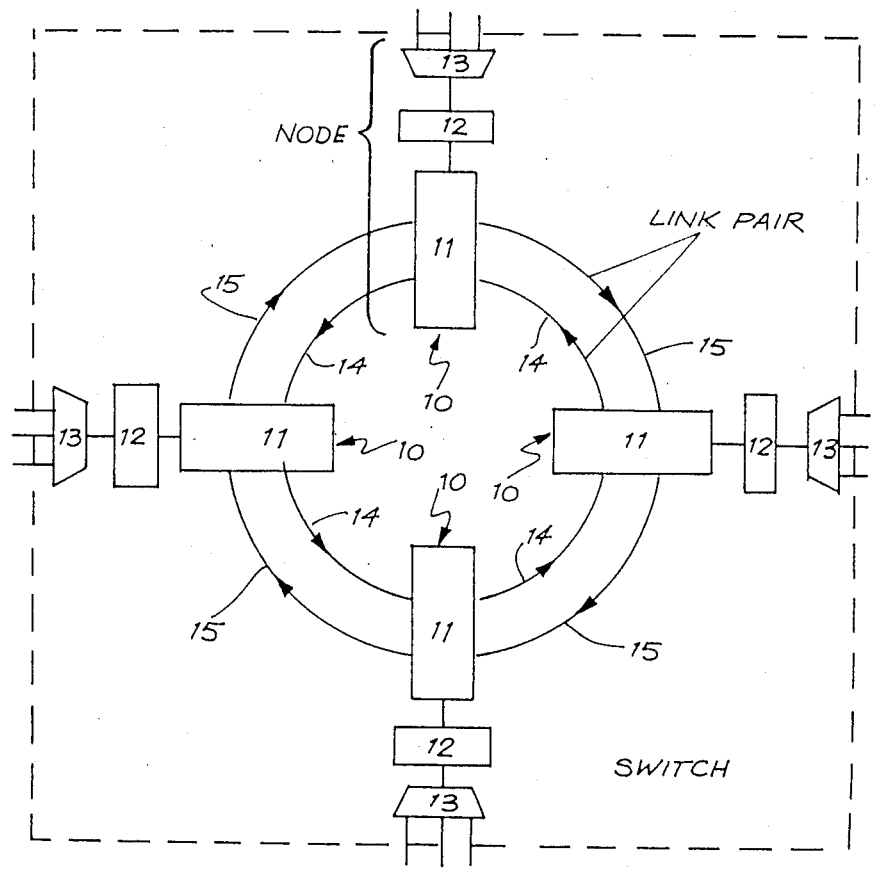
Figure 6:
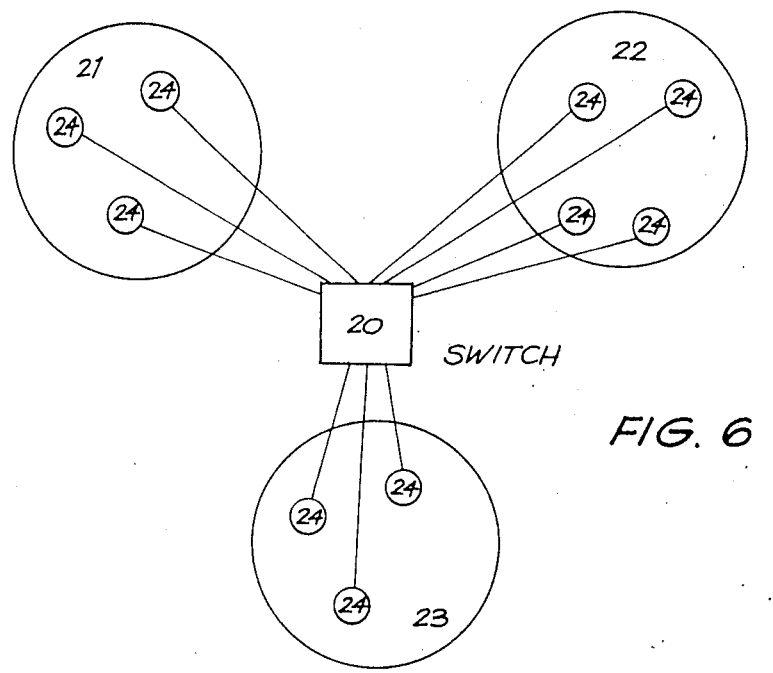
Figure 7:
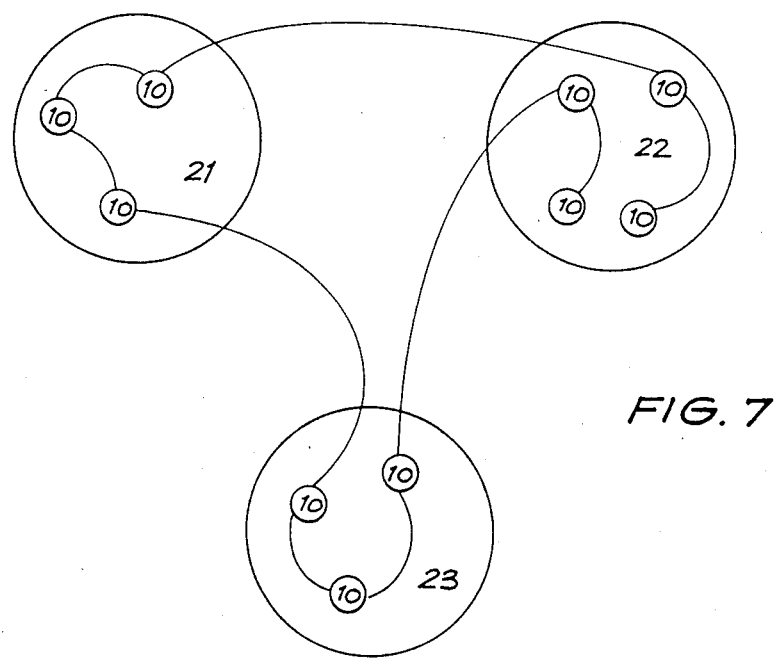
Figure 8A:
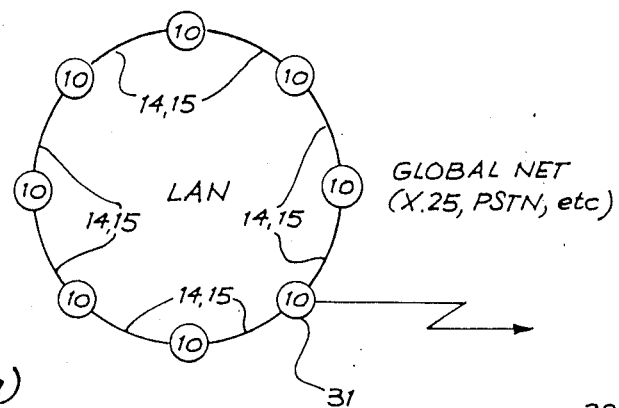
Figure 8B:
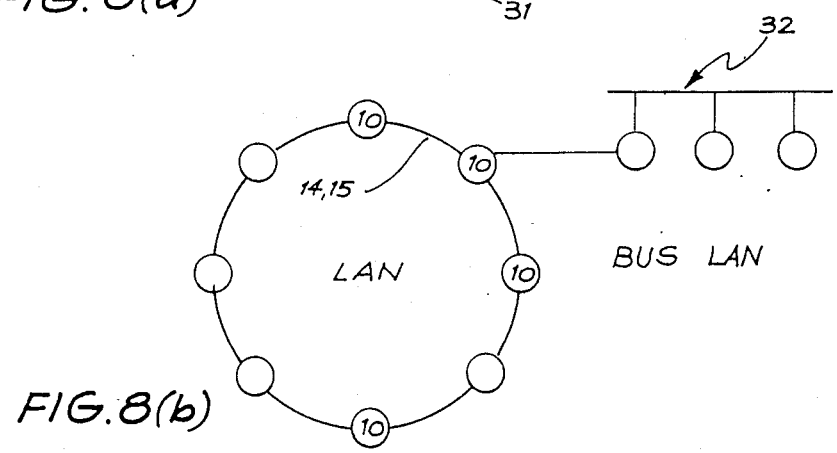
Figure 8C:
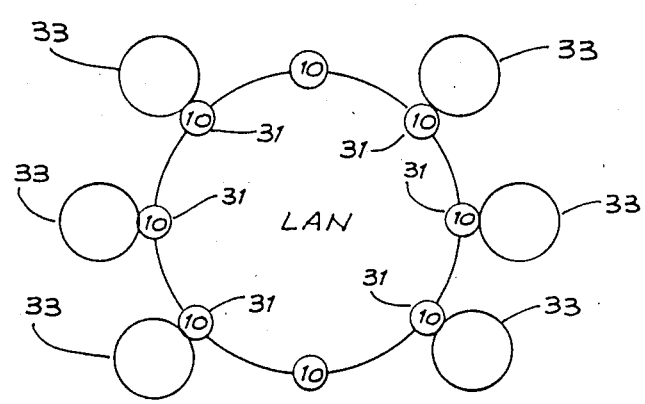
Figure 9:
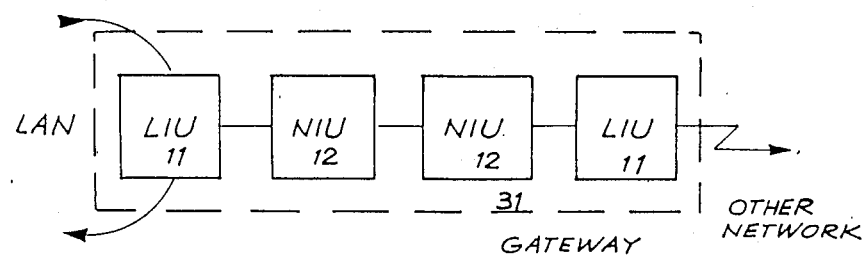
Figure 10:
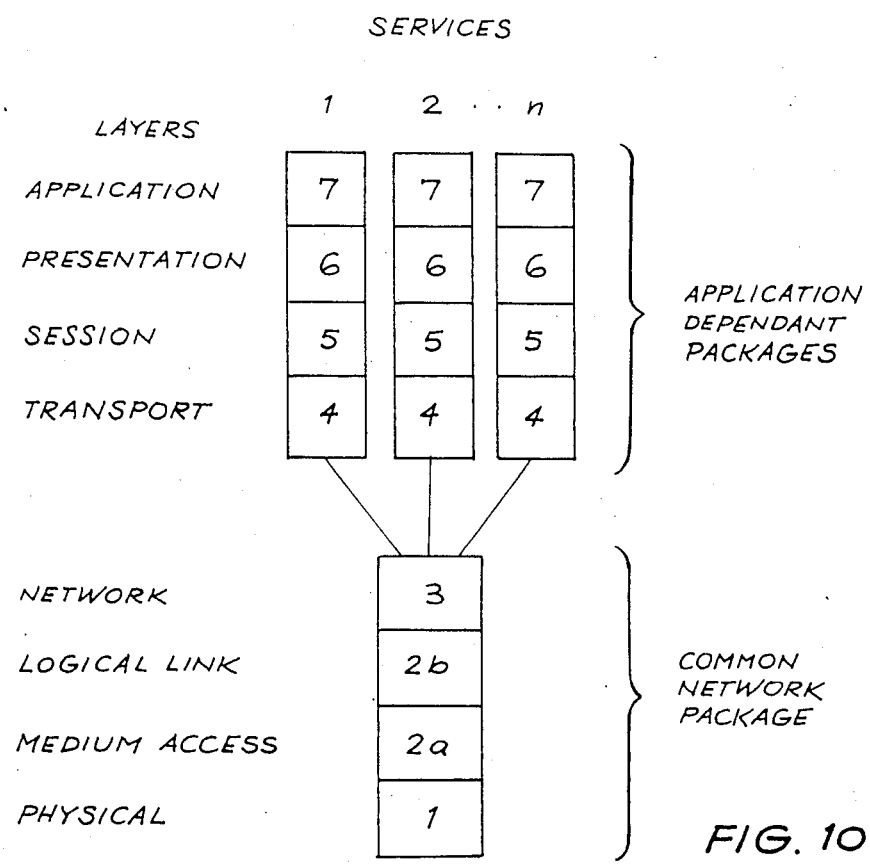
Figure 11:
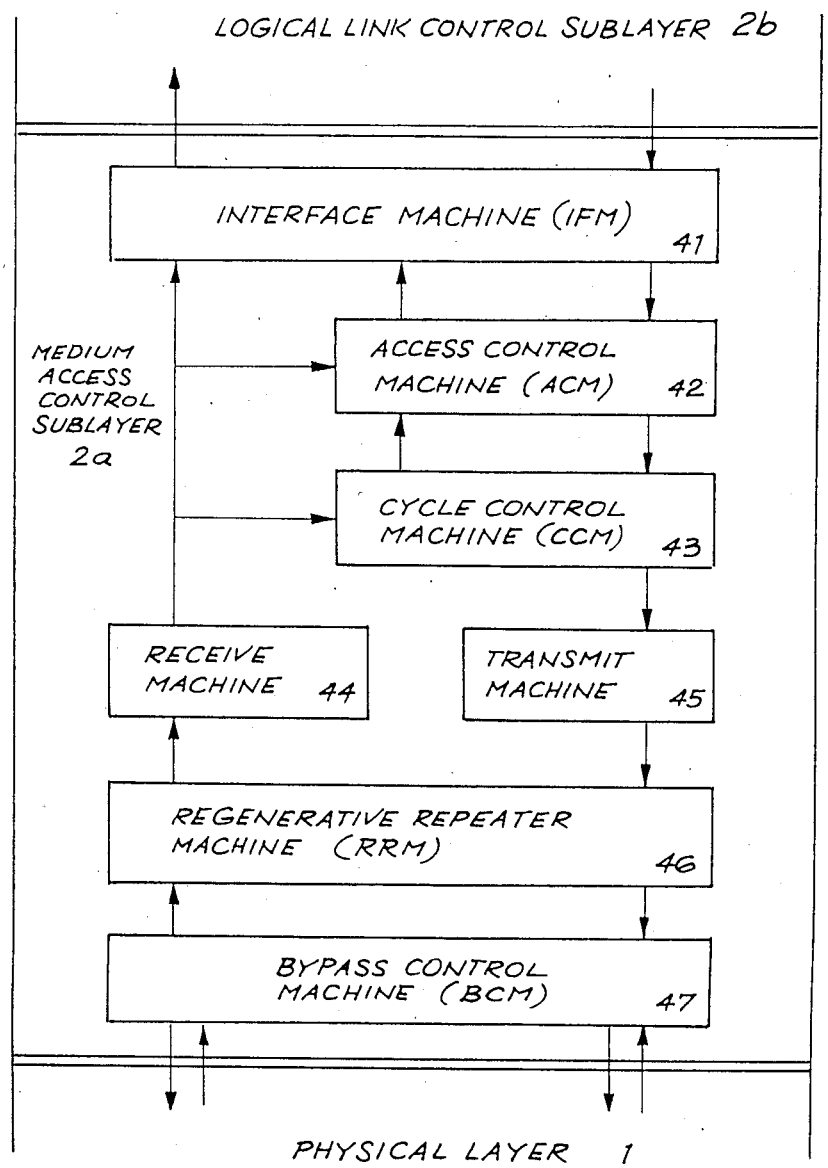
Figure 12:
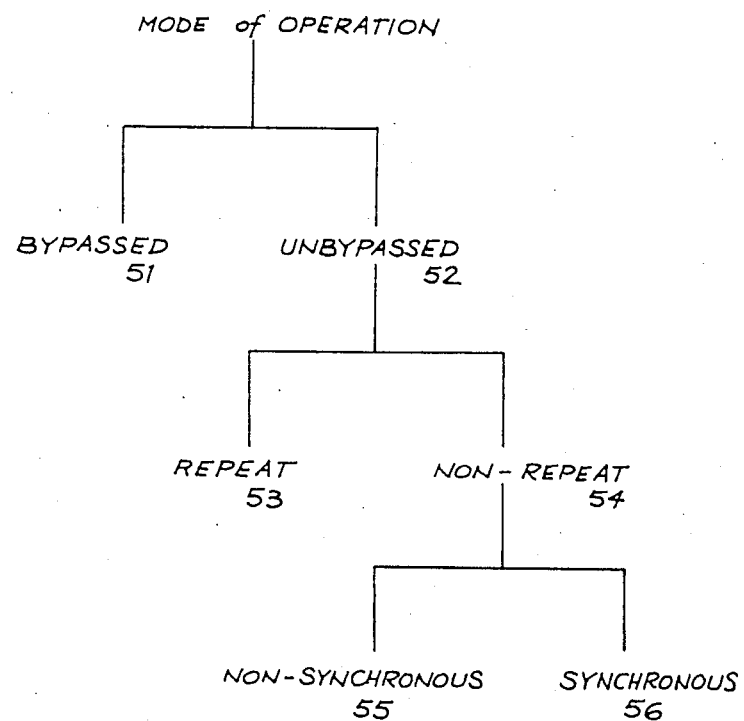
Figure 13:
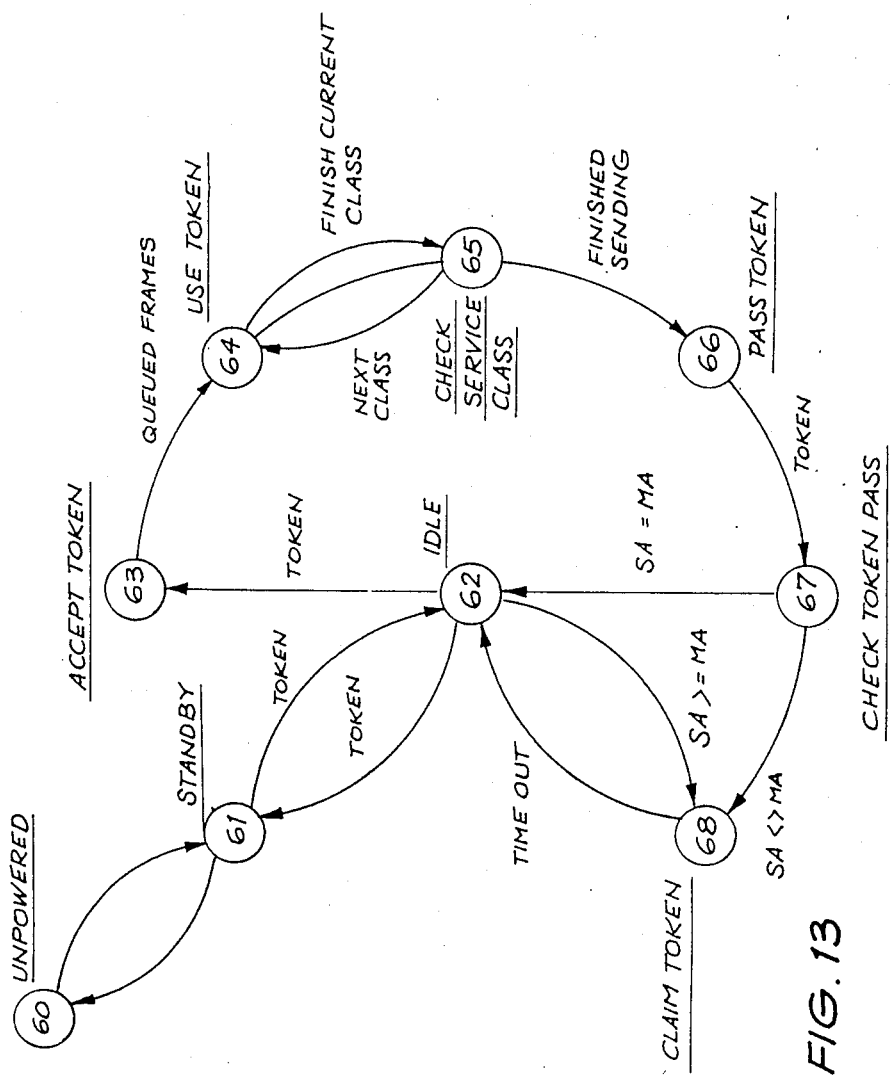
Figure 14:
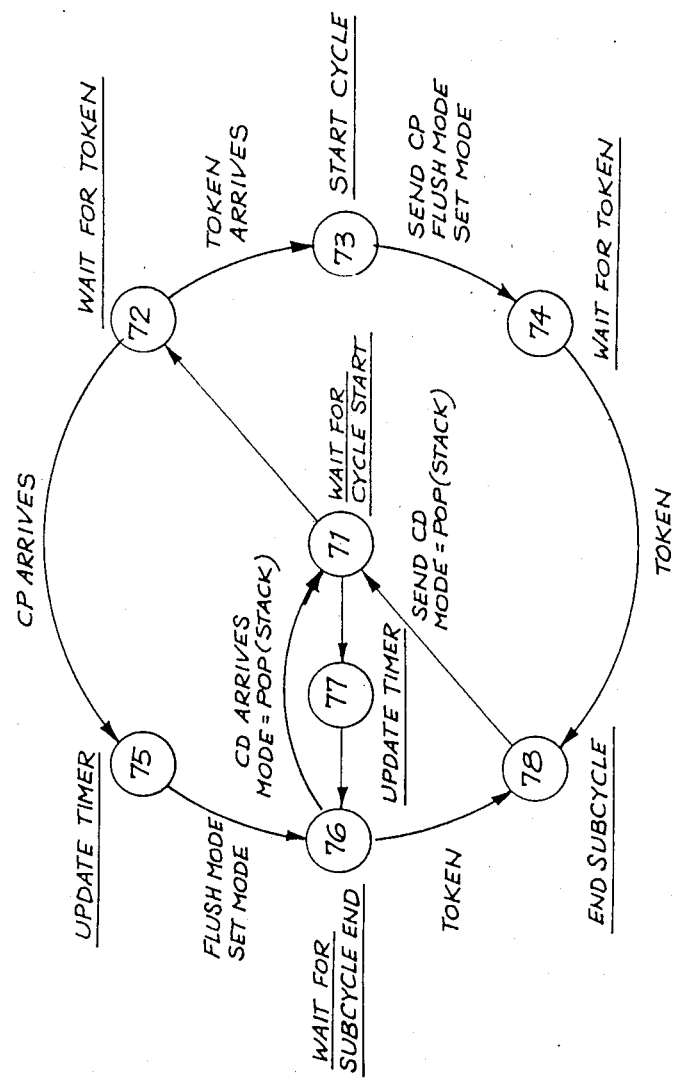
Figure 15:
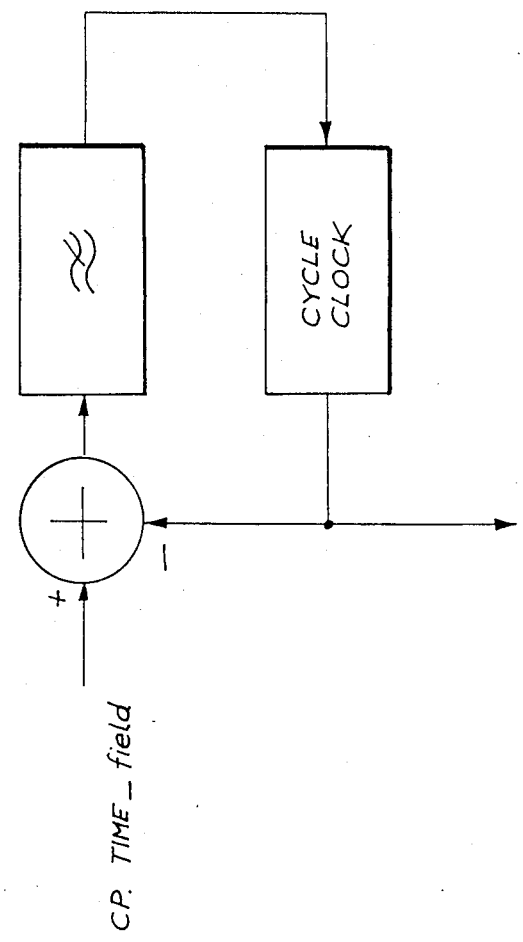
Figure 16:
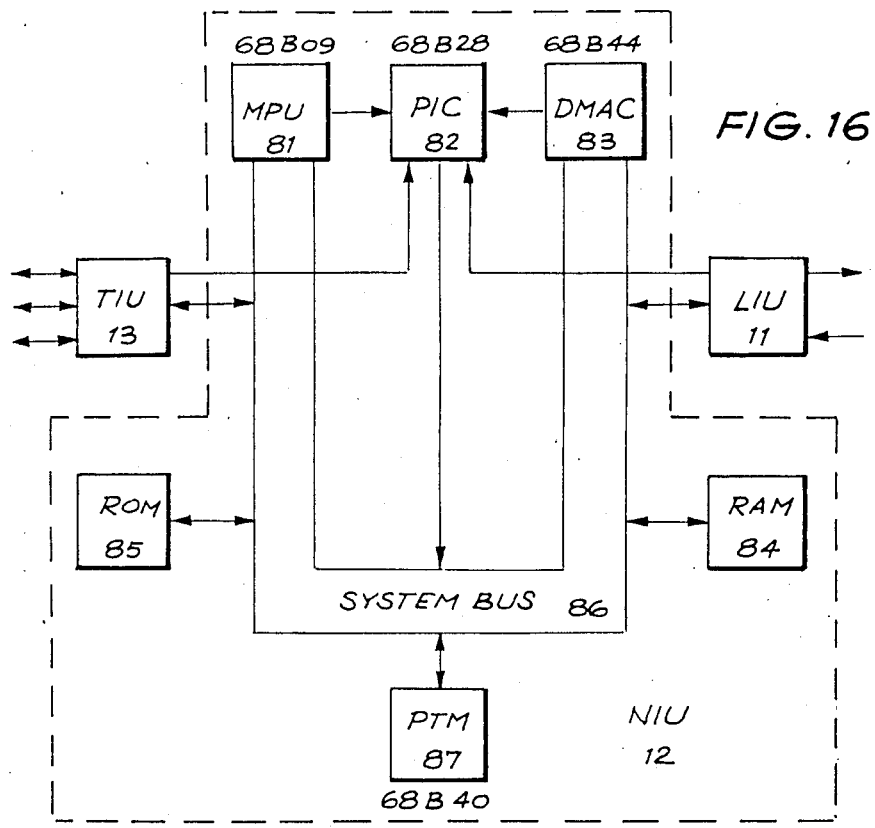
Figure 17:
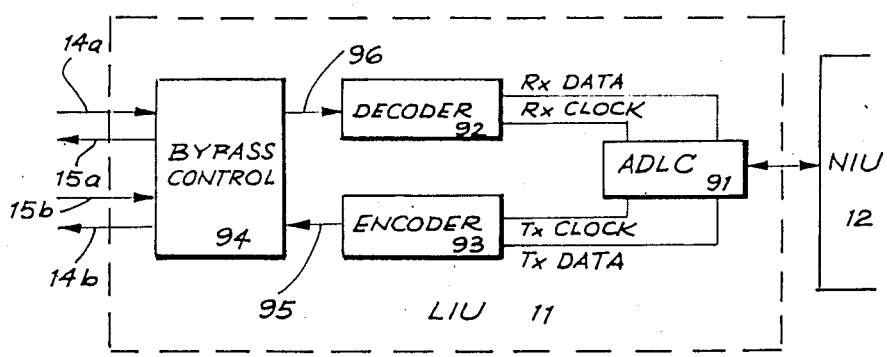
Figure 18:
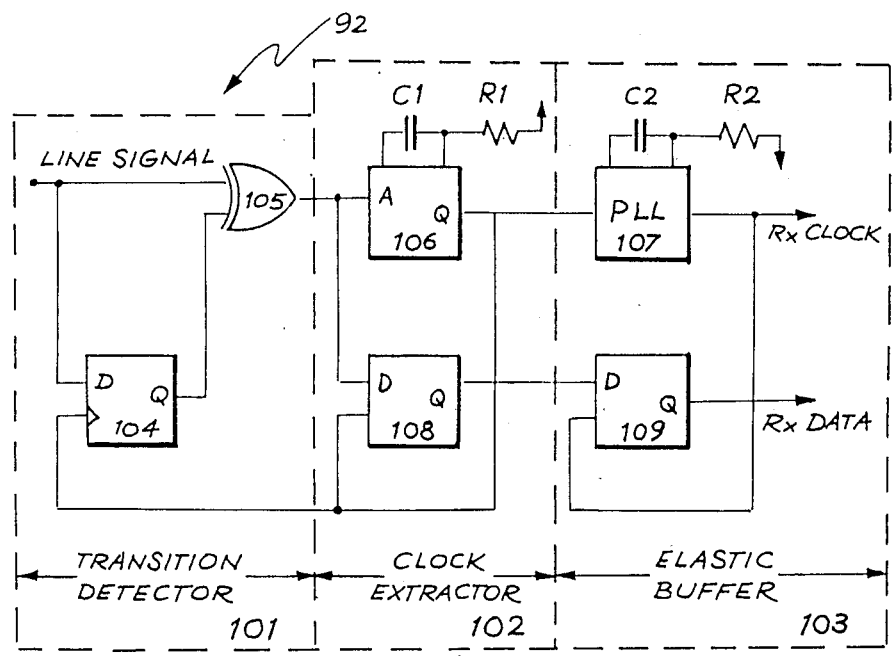
Figure 19:
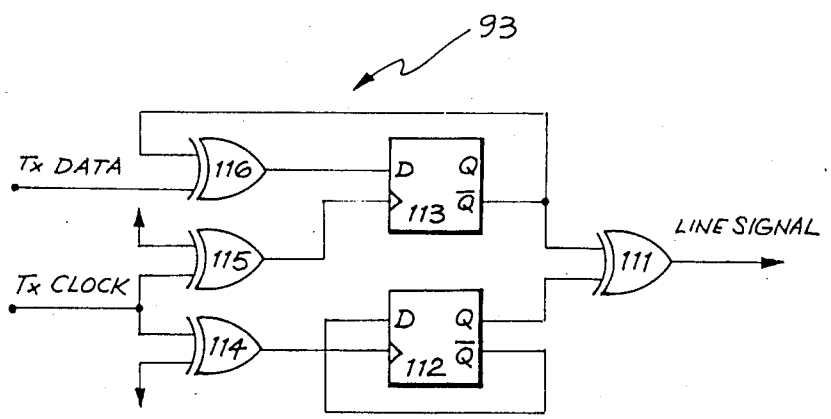
Figure 20:
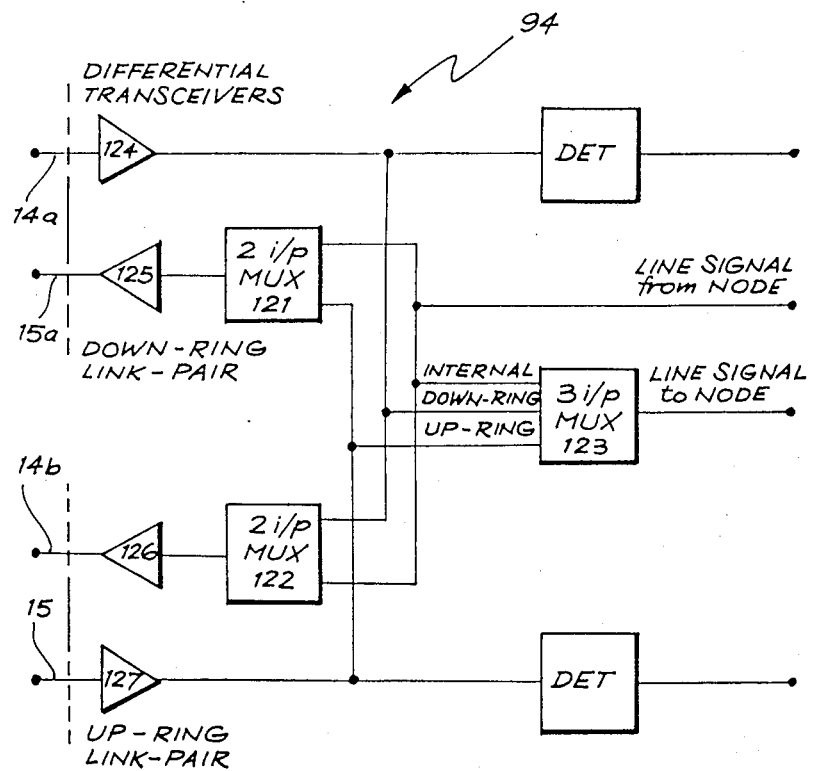
Figure 21:
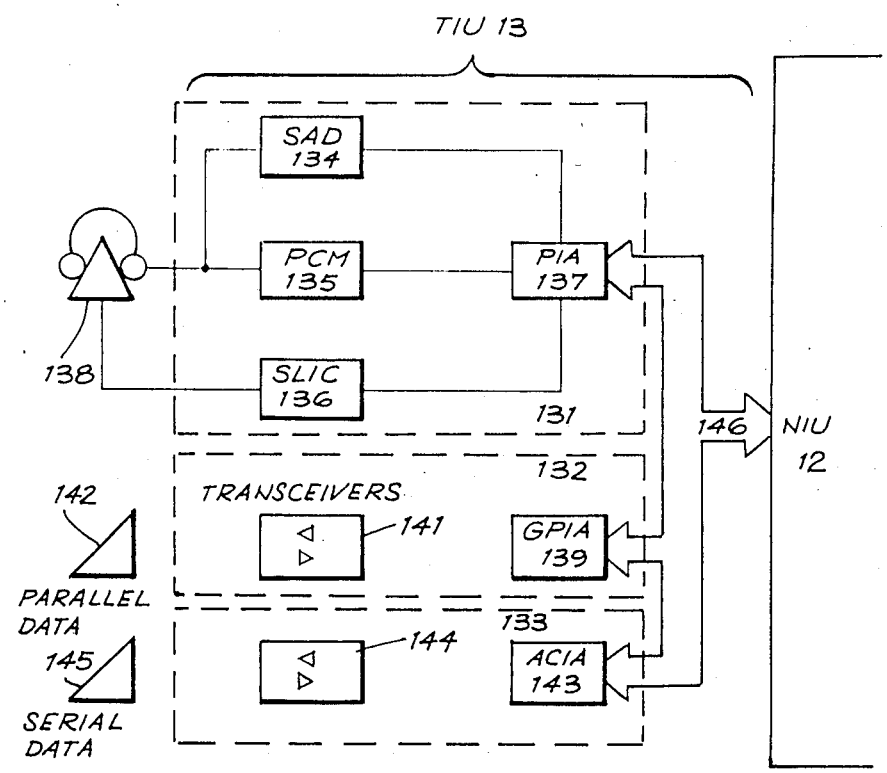
Figure 22:
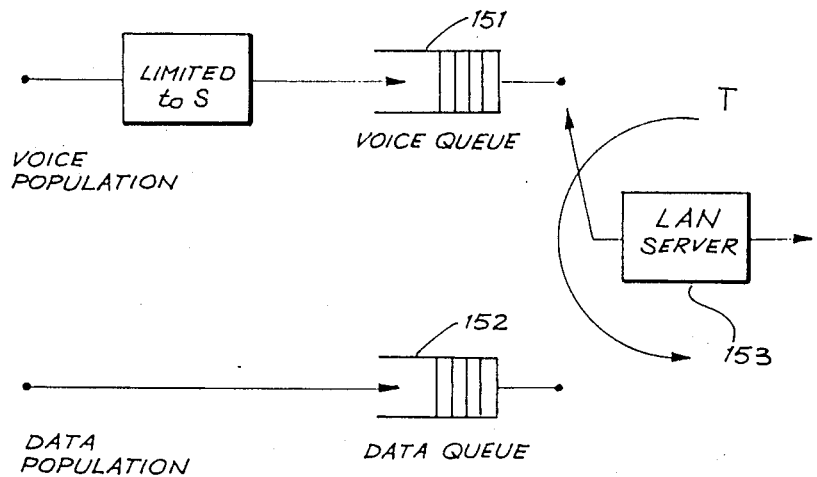
Figure 23:
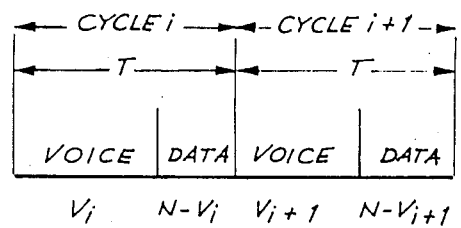
Figure 24:
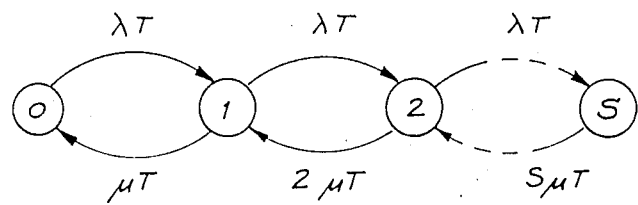
Figure 25:
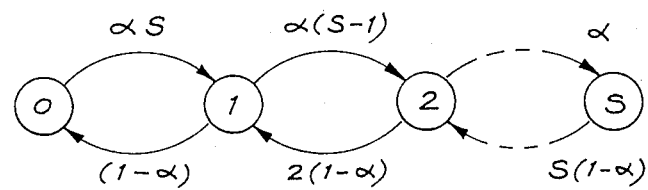
Figure 26:
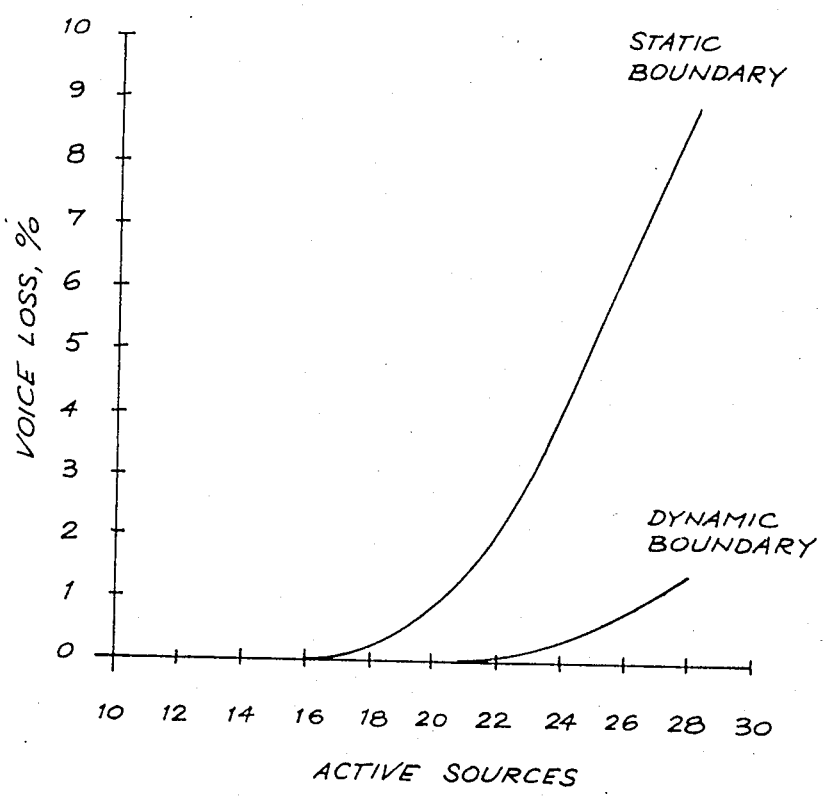
Figure 27:
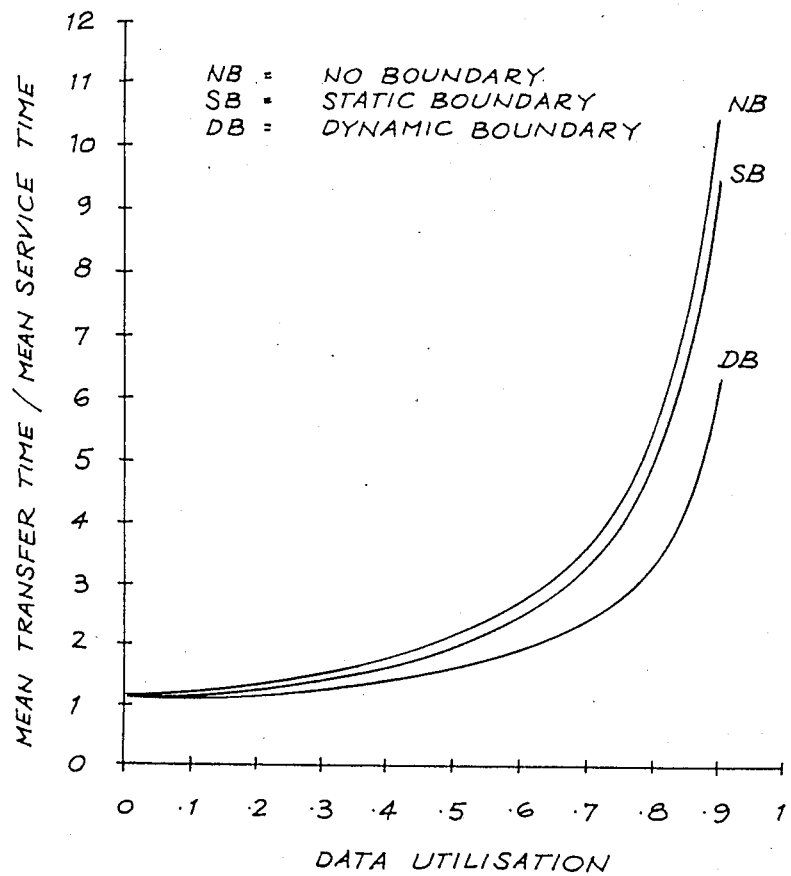

FIG. 6 schematically illustrates a prior art system having centralised switching;

FIG. 7 schematically illustrates the network of FIG. 6 when a decentralised switch is used;

FIG. 8 schematically illustrates three methods of interlinking the network of the present invention to other networks, FIG. 8a showing connection to a global network such as X.25 or PSTN, FIG. 8b showing connection to a bus LAN and FIG. 8c showing interconnection of several LANS according to the present invention to provide an extended LAN;

FIG. 9 schematically illustrates a possible gateway structure for use in the interconnected systems of FIG. 8;

FIG. 10 diagramatically illustrates the Protocol Architecture used in an embodiment of the present invention;

FIG. 11 schematically illustrates the operation of the Medium Access Control Sublayer of the Protocol Architecture of FIG. 10;

FIG. 12 diagramatically illustrates the modes of operation for a node of the system of FIG. 1;

FIG. 13 illustrates a state transition diagram for the Access Control Machine shown in FIG. 11;

FIG. 14 illustrates a transition diagram for the Cycle Control Machine shown in FIG. 11;

FIG. 15 schematically illustrates the operation of a mechanism for updating the Cycle Clock of each node of the system of FIG. 1;

FIG. 16 illustrates the architecture of the Network Interface Unit of the system of FIG. 1 in block diagram form;

FIG. 17 illustrates the architecture of a Link Interface Unit of the system of FIG. 1 in block diagram form;

FIG. 18 schematically illustrates a Clock Decoder for the Link Interface Unit of FIG. 17;

FIG. 19 schematically illustrates a Clock Encoder for the Link Interface Unit of FIG. 17;

FIG. 20 illustrates the Bypass Control of the Link Interface Unit of FIG. 17 in block diagram form;

FIG. 21 illustrates the Terminal Interface Unit of FIG. 1 in block diagram form;

FIG. 22 schematically illustrates a Cyclic Service Model used in the Protocol of FIG. 10;

FIG. 23 illustrates the cycle structure used with the Cyclic Service Model of FIG. 22;

FIG. 24 illustrates a call transition diagram used to demonstrate voice blocking probability;

FIG. 25 illustrates a talkspurt transition diagram used to demonstrate voice packet loss probability;

FIG. 26 graphically illustrates Probability of Voice Loss as a function of the number of active sources for static Boundaries (SB) and Dynamic Boundaries (DB) within the cyclic protocol; and FIG. 27 graphically illustrates Data Delay as a function of Data Utilisation for Cyclic Protocols having No Boundary (NB), Static Boundaries (SB) and Dynamic Boundaries (DB).

The communications needs of the local business environment can be broadly divided between voice and data. Until recently these needs have been satisified by the provision of a PABX for voice communications and dedicated links for data. Modern digital PABXs now support moderate rate data communications. However, the circuit switching techniques employed by PABXs are not well suited to the long holding times, low average activity and high burst rates of modern digital equipment such as personal computers and printers.

Local area networks (LANs) have been developed in response to the need to switch bursty data. LANs typically employ packet switching techniques which are intended for data communications. As such, LANs are generally not capable of high performance for voice communications and yield poor utilisation and excessive voice delay and loss.

One solution is to combine the PABX with the LAN and hopefully gain the benefits of both. While this approach has certain advantages, the operational segregation that remains between the switching of voice and data prevents the capacity of such a system from being used to its full advantage.

An embodiment of the present investigation will now be described which integrates the switching and transmission of voice and data communications. Integration occurs at all levels of the architecture—at the user access level, in the network software, and at the medium access level. Packet switching is used as the vehicle for this integration in such a way the system's capacity can be dynamically shared between all users. Key characteristics of the system are the use of speech interpolation to increase voice carrying capability, variable time-slots to improve data carrying efficiency, and a decentralised architecture to enhance reliability.

Problems generally encountered in networks employing packet switching for voice included excessive voice delay (leading to echo problems on Public Switch Telephone Network calls), and delay variance (resulting in glitching in the received voice signal). These problems are addressed and solved by the use of a Cyclic Service switching scheme for the integration of voice and data. The scheme allows the echo delay on calls to the PSTN to be made arbitrarily small while maintaining high utilization of the switch for local calls. Furthermore, the scheme results in a non-variable delay for voice packets.

Decentralised operation is a feature of the preferred embodiment of the invention and, as a result, a high degree of fault tolerance is secured; the failure of any single component will not being the system down.

The medium access mechanism is based on token passing. Unlike contention schemes, such as the Carrier Service Multiple Access/Collision Detection System, the mechanism does not show degraded performance when the network bandwidth is increased (Refer to 13). There is, therefore, no technical reason preventing the use of the system for networks capable of providing integrated service to thousands, or tens of thousands, of users.

The embodiment described herein is designed to accommodate up to 255 access points, however, it will be recognised that a person skilled in the art could readily adapt the system. Each access point offers three service ports which will typically be equipped with a telephone handset, a high speed data device such as a personal computer, and a moderate speed device such as a printer. The specifications of the system to be described are given in table 1.

TABLE 1

| PROTOTYPE SPECIFICATIONS | |
| --- | --- |
| Medium | Twisted Pair |
| Line Code | Biphase - S |
| Signalling Rate | 2 M Baud |
| Access Address Space | 255 nodes |
| Voice Aspects: | |
| Capacity | 12 simultaneous calls |
| Loss | <1% |
| Delay | 8 ms (to PSTN) |
| Attack Time | <0.4 ms |
| Hangover | 150-250 ms |
| Data Aspects: | |
| Bandwidth | 1 M bit/sec |
| Delay | 3.5 ms (1K bit packets) |
| Interfaces | IEEE - 488; V.24 |

The integrated switching facility of the LAN architecture is realised as shown in FIG. 1. The switch is composed of self-contained switching entities called nodes 10, each containing three fundamental units; a Link Interface Unit (LIU) 11, a Network Interface Unit (NIU) 12, and a Terminal Interface Unit (TIU) 13. The LIUs are tightly coupled by means of pairs of unidirectional links 14, 15 and all data movement and synchronisation between nodes is controlled by the LIUs 11. User devices (telephone handsets, terminals and so on) are connected to the switch by way of the TIUs 13 and the operation of each node, and of the switch as a whole, is controlled by the NIUs 12. The nodes are microprocessor based units with a "dual processor" like structure for efficient data transfer and processing.

From a topology viewpoint, the switch structure of the present invention when operating in its normal operating mode, has the form of a ring. The LIUs 11 of each node forms an integral part of the ring structure, and acts as a regenerative repeater. Under normal operation, each LIU 11 transmits data and synchronisation information to the succeeding one of its adjacent nodes over one link 14 of its link-pair, while the other link 15 normally returns a synchronisation signal from the succeeding node. Hence, data is transfered unidirectionally between LIUs 11 around the ring, while each node receives synchronisation signals from its two adjacent nodes.

Figure 2:
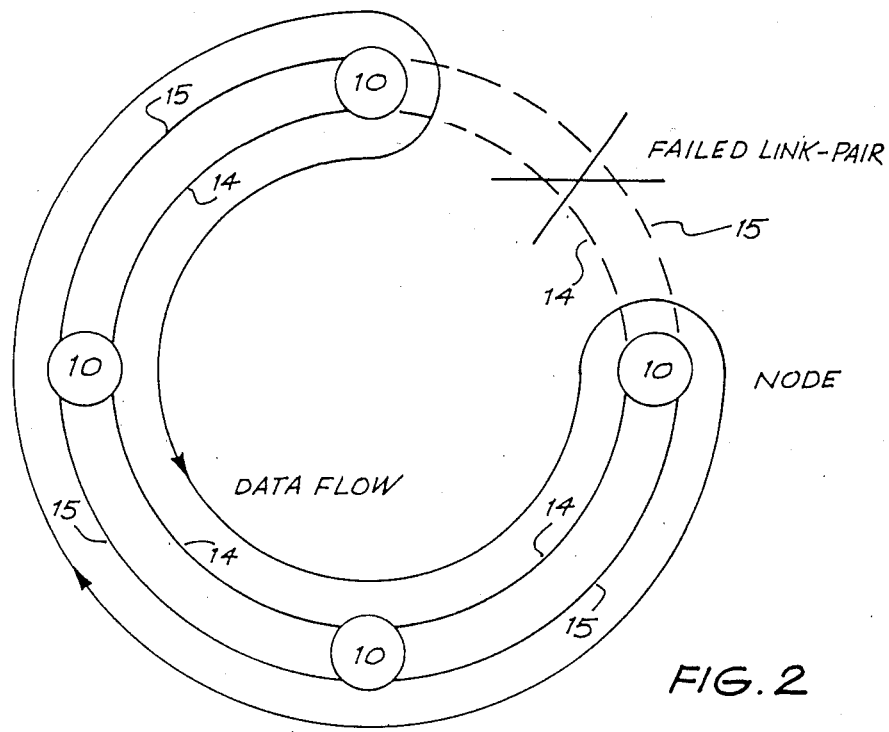
Figure 3:
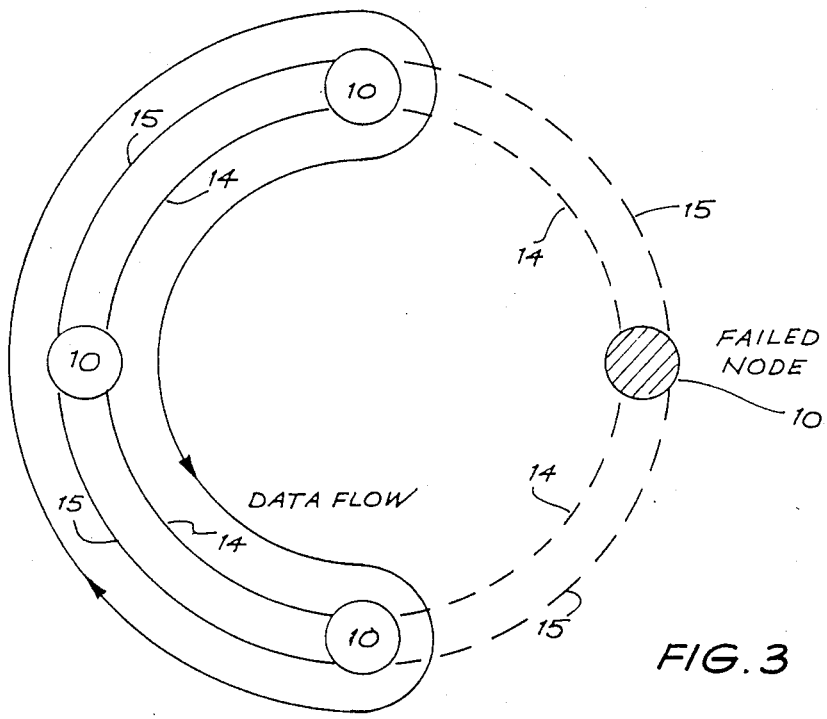

If a link-pair fails, the node adjacent to the failure detect a loss of synchronisation signals, and as part of a decentralised recovery protocol, each node internally reconfigures its link connections so that the data flow can continue, as shown in (FIG. 2). If an individual node fails, that node will, provided it is able, bypass itself by providing a through-connection between each link pair. This effectively removes the node from the ring. In the unlikely event that the node fails in such a way that it is unable to bypass itself, it is forcibly ejected by the adjacent nodes as indicated in FIG. 3.

It should be noted that this recovery scheme does not rely on the failure of only one link 14 or 15 of the link-pairs, as in the case of "double-ring" systems. Either, or both, links may fail and the switch is able to recover. This has the advantage that the links need not be run via different paths, in different conduits, to reduce the risk of both rings being severed. In fact, each link-pair can conveniently be provided by a single, multi-conductor cable (for example, four-wire telephone cable). The only requirement imposed by the scheme is that the mean repair time (of a link or node) be much less than the mean time between failures. This is to ensure satisfactory operation under single fault conditions. Double fault condition is virtually impossible, if proper monitoring and servicing procedures are observed.

These fault recovery aspects illustrate the high availability of the switch. For example, if a link-pair 14.15 fails, the system still maintains full availability, while the failure of an individual node 10 affects only the users directly connected to that node. Hence, the self-contained nature of the nodes, together with the decentralised fault recovery protocols, provide the switch with a high degree of fault tolerance. In particular, the switch is not prone to the "prime-failure" problem found in systems employing a more traditional centralised approach. The active role taken by the LIUs 11 as regenerative repeaters in systems according to the present invention means that, to a large extent, the operation of the switch can be made independent of the distance between the nodes, allowing the switch to be geographically dispersed.

Data and real time traffic, including voice, can be handled by the switch. However, separation of circuit and packet switching is not required. On the contrary, integrated packet switching results in improved performance compared with segregated circuit and packet switching. This has economic (Refer to Ref 1) and technical advantages.

The ICPS has advantages of packet switching for both voice and data traffic. For data, packet switching provides higher burst rates and greater channel utilisation than is possible with circuit switching. For voice, the self addressing capability of packet-mode communication enables efficient switching of voice traffic without the need of a central circuit switch (such as a timeslot interchanger). The nodes are fully autonomous, with the switching functions decentralised to the nodes. This results not only in improved voice and data performance characteristics, but also enhances robustness to component failure, and facilitates expansion and maintenance of the switch.

The traffic supported by the switch is functionally divided into two groups: synchronous, including voice, requiring the equivalent of a switched circuit; and non-synchronous data, which is best handled by packet-switching.

Bandwidth is made available to the two groups by means of a cyclic service scheme. This is a dynamic polling scheme which is an adaptation of two well-known, and established, techniques: hybrid switching (Refer to Ref 2) and token-passing (Refer to Refs 3–4).

The reliability of the LAN architecture, afforded by the fault recovery mechanism already described, is complemented by the fully decentralised use of token passing. No single node is responsible for maintenance of the token mechanism; rather, token maintenance is the cooperative effort of all nodes involved in token passing. Decentralised control of token passing has been described in the past with reference to systems such as ProNET (Refer to Ref 6). The decentralised nature of the token mechanisms of ICPS resemble more closely the IEEE Token Bus standard (Refer to Ref 7) than the Token Ring (Refer to Ref 8).

Figure 4:
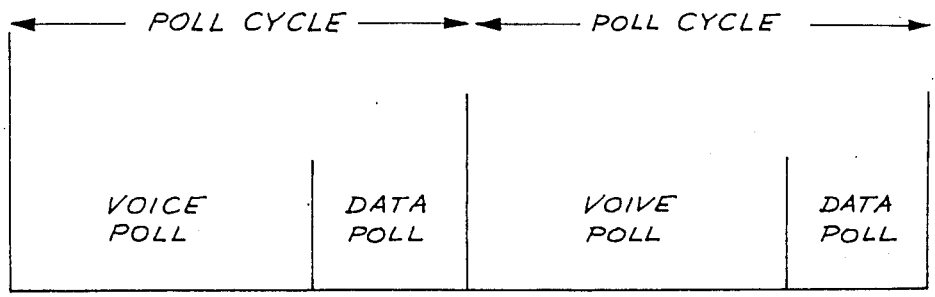
FIG. 4 illustrates the cycle structure for an embodiment of the invention having a single System Poll Cycle.

In operation, switched circuit capacity is made available to the synchronous group by polling that group (Voice Poll) on a periodic basis. The non-synchronous group is polled (Data Poll) during the remaining time. Switch capacity is consequently shared between the two groups as depicted in FIG. 4.

Within each group poll, the polling rate is not fixed but is determined by the volume of traffic offered by the group. This reduces the time taken to complete a group poll and results in a dynamic allocation of bandwidth between the groups. Furthermore, the timeslots within each group are not pre-assigned, nor are they of fixed duration, but are made to expand or contract to meet the needs of users.

The period of the poll cycle and the size of the voice packets are jointly chosen so that the bandwidth requirement of speech is satisfied. Given that PCM is used to encode the speech signal, a node should receive the equivalent of a 64 Kbit/sec telephone circuit. Since packets need not be fixed in length, a node may send a packet of, say, half the size of a voice packet each poll, thereby receiving a 'circuit' of 32 Kbit/sec capacity. Similarly, capacities larger than 64 Kbit/sec are available by using packets larger than a voice packet.

In addition to the use of variable packet lengths, the position of packets within the poll cycle is not pre-assigned. Hence, a source is not committed to transmit a packet each and every cycle. This means that data capacity can be used on a demand basis, allowing the system to handle a wide range of burst rates from individual sources. It also means that speech interpolation is readily supported, effectively doubling the capacity of the voice poll. The voice packetisation delay is equal to the cycle duration, while the total end-to-end delay imposed on voice by the switch is twice the cycle duration. The end-to-end delay includes both the packetisation delay and the delay resulting from the variance smoothing mechanism provided by the switch design, as will be described.

Selection of the cycle duration is subject to the following 3 considerations:

(1) the echo-path delay is twice the end-to-end delay and, hence, is four times the cycle duration. As noted by Seidel and Koop (Refer to Ref 9) spurious echo couplings within a system such as this tend to limit the allowable echo-path delay to about 100 ms for satisfactory echo performance. This limits the cycle duration to about 25 ms.

(2) The length of the voice segment carried by each packet equals the packetisation delay. It has also been observed (Refer to Refs 10, 11 and 12) that the effect of the occasional lost voice packet can be rendered negligible by limiting the segment length to about 19 ms. Hence, the cycle duration should also be less than 19 ms.

(3) As will be shown later the effective switch capacity is proportional to the packetisation efficiency. If $L_P$ represents the number of voice samples per packet, and $L_H$ the packet byte overhead, the packetisation efficiency $\eta_P$ can be written as $$\eta_P = (1 + L_H/L_P)^{-1} \quad (1)$$

Hence, efficiency is only marginally improved when $L_H/L_P$ is reduced below 0.1. Given that a 10 byte overhead is incurred by voice packets, to accommodate frame information, the voice segment length should be greater than about 13 ms if PCM encoding is employed. In view of these considerations, a 16 ms cycle duration was chosen.

When the switch is used by voice sources engaged in conversation with an external party (that is, a party within the PSTN), the echo-path delay needs to be reduced below the 64 ms inherent in the switch design. Seidel and Koop (Refer to Ref 9) have considered this situation and conclude that an echo-path delay of less than 26 ms is required to provide satisfactory echo performance.

Seidel and Koop suggest that the delay may be appropriately reduced by limiting the voice segment duration of each packet to 11.75 ms and reducing the offered voice traffic to the extent that the transfer time is about 1 ms, thereby obtaining an end-to-end delay of less than 13 ms as required. However, this solution has two major deficiencies.

(1) the transfer time quoted is based on the average transfer time of a data packet (Refer to Ref 13). The actual delay can be considerably greater than the average and in order to guarantee that the delay exceeds the expected 1 ms transfer time only rarely, the offered trafic must be reduced below the level suggested by Seidel and Koop. This means that more than half the system capacity would have to be wasted.

(2) the calculation of end-to-end delay makes no allowance for the delay imposed at the receiving end by the delay variance smoothing method. To eliminate the effective delay variance, the end-receiver, which is complementary to the transfer time. Hence, the end-to-end delay must be equal to the packetisation delay plus the maximum transfer time of a voice packet.

In order to limit the echo delay of external cells to a sufficiently low value while maintaining high switch efficiency for internal calls, the embodiment described herein defines two subgroups within the voice group:
1. local voice, for use within the local domain of the switch; and
2. junction voice, for voice communication into and out of PSTN.

Figure 5:
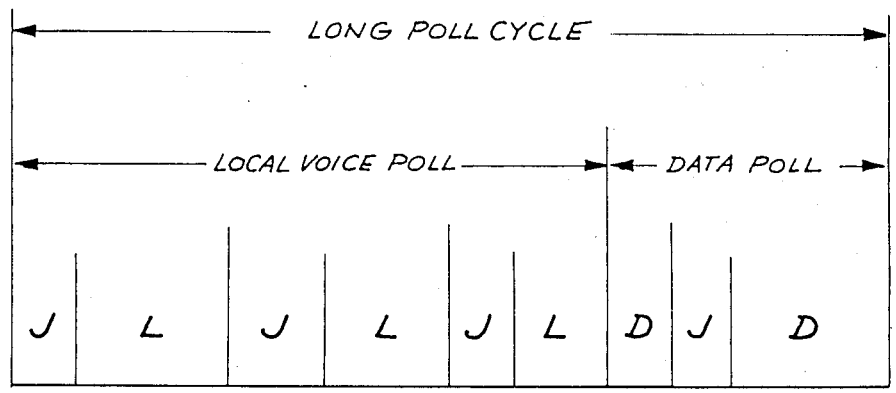
FIG. 5 illustrates th cycle structure for an embodiment of the invention having Long and Short Poll Cycles.

The local voice users are polled within the synchronous data group as already described. However, in order to support the junction voice group, a poll cycle with a short duration is overlaid on the existing cycle structure, as is shown in FIG. 5. Junction voice users (Short Poll cycle-J) are polled periodically as a group, as are the local voice users (Local Voice Poll-L). However, the period between junction voice polls is shorter. By suitably selecting the short poll cycle duration, the echo path delay seen by junction voice users can be made arbitrarily small. For example, with the short poll cycle design value of 4 ms, the echo-path delay is only 16 ms. This is well below the suggested maximum of 26 ms.

Since junction calls are expected to be a small percentage of the total switch traffic (for example, less than 10%) in a LAN-based application, the loss of switch capacity resulting from the small junction voice packets is negligible (less than 2%).

Consider the situation where the users within a local communication community are concentrated at a number of discrete sites. The sites may be rooms on a single floor of an office building, separate floors, or even separate buildings. The traditional approach is represented in FIG. 6, where the switch 20 occupies a central location and a star topology is used to provide access to user equipment 24 at various remote sites 21, 22, 23.

As mentioned earlier, the active role performed by the LIUs 11 in regenerating all ring transmissions, together with the decentralised nature of the switch design, means that the switch lends itself to geographic distribution of the nodes 10. The network solution using a distributed switch is illustrated in FIG. 7. Clearly, the distributed switch implies economics in cabling, while expansion of the system to include other sites is facilitated. The fault recovery scheme employed by the switch allows new sites to be simply "spliced" into the ring. During the splicing operation, the switch reconfigures itself to bypass the affected ring segment.

It is possible to use a topology other than the ring to connect users of a LAN; for example, a bi-directional bus, such as Ethernet and Arcnet (Refer to Ref 14, 15) or a unidirectional bus, such as Expressnet or Fasnet (Refer to Ref 16, 17). However, the ring is the only elementary topology which maintains full connectivity when any single link is cut. Systems made in accordance with the present invention exploit this characteristic, and therefore provide a high degree of fault tolerance.

There are three different applications envisaged by Xlnet architecture:

(1) As an automatic office communication system providing the facilities of a modern PABX and the data handling capabilities of a LAN.

(2) As a convenient and efficient means of sharing, amongst many users, a variety of resources such as high quality printers, mass storage devices, data bases and so on, which are becoming commonplace in the office environment.

(3) As a means of extending, into the local domain, the integrated access facilities of the developing ISDN technology.

In order to support these applications, the TIU 13 is designed to be a multi-port device. The basic TIU design provides for three ports:
(a) a four wire analogue voice port,
(b) a high speed data port through which a variety of service can be accessed, and
(c) a low speed data port (printers, TELEX, etc).

The interface standard used by each port would be application dependent. For example, in satisfying the first application, the TIU could be connected to (or built into) an integrated workstation providing the user with access for the PABX and LAN facilities of the network. In this case, the interface may be of a propriety nature, including DMA.

Attachment of shared resources to the network would be by way of standard interfaces. In the basic architecture of embodiment of the invention, the high speed port is equipped with the IEEE-488 (or General Purposes Instrument Bus). This interface was chosen for its transfer rate (up to 1M Bit/sec) and because many items of equipment (such as personal computers, notably Hewlett-Packard and Commodore) provide this as their standard high speed interface. The low speed port (up to 19.2K bit/sec) uses the V.24 (or RS-232c) standard for similar reasons.

In the third application, the three ports of a TIU, together with the networks' ability to support integrated synchronous and non-synchronous traffic, means that the 2B+D (two 64 Kbit/sec channels & one 16 Kbit/sec channel) Integrated Services Digital Network (ISDN) interface can be provided by each node of the network. Attachment of ISDN-compatible equipment can be made, thereby giving the LAN users the facilities of ISDN within their local environment. When ISDN is ultimately available in the more global environment, its facilities will be readily extended to customers who are already making use of them in the local domain.

In keeping with the growing trend towards open systems interconnection (OSI), with its advantages of a wide range of vendor devices and support, and the modularity of design of open systems, the network software architecture is based directly on the OSI seven-layered Reference Model. Application packages, specific to a given application, perform the upper four layers of the architecture. These packages are generally provided by the particular user device.

The network service offered by the network is common to all applications and is composed of the lower three layers of the OSI model. The Data Link layer is further divided into two sub-layers as recommended in the IEEE 802 documents. The Medium Access Control sublayer uses many of the recommendations of 802.4 (Refer to Ref 7). For the Logical Link Control Sublayer, the 802.2 Class 1 protocol (connection-less operation) is adopted (Refer to Ref 9). Similarly, the OSI Connection-less Network Protocol (Refer to Ref 20) is selected for the Network Layer. The resulting network service offers an efficient and reliable datagram service which is well suited to a number of LAN-based applications, inluding packet voice. For those applications requiring a connection-oriented service, the appropriate choice of Transport Layer software is the OSI Connection-Oriented Transport Protocol Class 4 (Refer to Ref 21).

The LAN architecture can support a variety of specialised network functions such as PABX service, gateways, network supervision, network administration and PABX consoles. These functions would be implemented in the form of application packages.

The PABX facilities of the network are supported by the Telephone Package which is resident in the NIUs. Briefly, the functions of the Telephone Package are divided between the four layers as follows. Layer one is the Telephone Handler which performs the role of the Subscriber Stage and Register of a telephone exchange. The Presentation Layer performs the encoding and decoding of the speech signal, handles segmentation and reconstruction of the speech samples, and performs speech interpolation using a dynamic speech activity detection algorithm. The Session Layer is responsible for establishment and maintenance of calls. Included in its functions is a voice admission policy which controls the extent to which the voice service cycle is utilised. The Session Layer embodies many of the PABX facilities such as redirection and follow-me calls, together with selective barring of incoming and outgoing calls. Finally, the Transport Layer packets the voice segments for transmission by the network service.

Referring to FIGS. 8a, b, & c, interworking with other networks takes place via a network function called a Gateway 31. The LAN may be expected to interwork with a more global network, such as the PSTN, or with another LAN 32 or 33. In particular, the LAN may form a sub-network of a larger local network as illustrated in FIG. 8c. This would be an attractive means of extending the capacity of an existing installation. The example illustrated in FIG. 8c is intended to show how a large, multi-storeyed office building might make use of a network of Lans according to the present invention. Each floor, or group of departments, with a high degree of localised communications, has its own ring 33 connecting users within that area. Each ring, in turn, is connected via a building ring to provide for inter-departmental communications. Provided that the degree of localised communications within each ring is relatively high, this approach may well be superior to an approach based on the use of a single, high capacity ring. e node architecture, discussed already, lends itself to a gateway implementation of the form illustrated in FIG. 9. The gateway architecture represented by FIG. 9 is basically the concatenation of two nodes. The TIUs 13 have been omitted since communication between NIUs 12 would most likely be by way of DMA between shared memory. A gateway of this form has been previously described by Shepard, D. et al (Refer to Ref 22). With this structure, one LIU-NIU pair 11,12 operates under the LAN protocols developed by the system of the present invention, while the other operates under the LAN protocols of the system which the gateway connects, such as X.25. Effectively, the gateway unit 31 performs the protocol translation function described by Turner K (Refer to Ref 23).[23]. Further, just as the TIU 13 of a node can be a multi-port device, so too can the LIU 11. Hence, if the other Network requires a multi-port physical connection, this can also be accommodated.

While the LAN architecture is designed to promote fault tolerance by allowing the nodes to autonomously handle fault situations as they arise, it is also desirable to provide the network with a site to which fault and error statistics can be assembled for analysis by the network operator. This network function can be provided by a node equipped with a Network Supervision package.

Two modes of operation are envisaged as part of the architecture of embodiment of the present invention.

(1) The Network Supervisor may periodically poll each node using a Service Poll packet. In response to the service poll, a node returns, to the Supervisor, the appropriate statistics, such as the bit error rate perceived by the node, in a Service Response packet.

(2) The node may spontaneously transmit, to the Supervisor, a Service Response packet in the event of a serious fault being detected. For example, if a link failure is detected, the node will recover from the failure by reconfiguring the ring as already mentioned, and will inform the Supervisor of the event. Similarly, when the failure disappears (having been repaired, for example), the node once again reconfigures the ring and informs the Supervisor accordingly.

The Poll/Final bit of the control field of the Service Response could be used to distinguish between the two modes of operation.

It should be noted that while the existance of the Supervisor is an advantage, its failure does not mean failure of the system as a whole. Hence, duplication of the Supervisor function, may not be necessary.

The Network Administration function is complementary to the Network Supervisor and is implemented in a similar fashion. The Administrator polls nodes to obtain information such as billing statistics for each user. Other functions include the allocation of user addresses (such as Telephone numbers) and selective barring of user access. This latter function is a specific case of a more general function—the establishment of allowed user facilities. Included in this function is the establishment of the voice traffic parameters used by the voice admission policy within the Telephone Session Layer.

PABXs are typically provided with a console (or switchboard) to which, for example, unanswered incoming calls can be diverted. The PABX Console function can be implemented in the LAN architecture in a similar fashion to the Network Supervisor and Network Administrator. Taking the unanswered incoming call situation as an example, the operation of the system would proceed as follows. Upon the arrival of an incoming call indication, the Telephone Gateway (interworking with the PSTN) attempts to establish a Call with the appropriate node's Telephone Session Layer. Supposing that the user has left his terminal unattended, the Session Layer will either know the Call cannot be established (because the user has so informed his node), or else will timeout when the Call Indication goes unanswered. In either event, the Session Layer informs the Gateway which then establishes the Call with the PABX console. The call can then be answered by either an operator, or by a recorded (digitised) message.

The architecture of a LAN made in accordance with the present environment is designed to efficiently integrate mixed voice and data traffic using a cyclic service scheme. This has been briefly described previously, however the implementation of mixed traffic will now be considered in more detail and compared with more traditional switching techniques. For simplicity, only one class of voice traffic has been considered in this examination.

Embodiments of the invention employ a cyclic service scheme which operates by dividing time into fixed length intervals called Cycles. During the first part of each cycle, nodes gaining access by receiving the token may transmit only voice packets. In the latter part of each cycle, only data packets may be transmitted.

Generation of the cycle timing is not the responsibility of a single central controller, but is rather the result of a cooperative effort on the part of the LAN nodes. Detailed discussion of the mechanisms behind the scheme for timing generation will be dealt with later; however, the principle is as follows.

Each node maintains a Cycle Clock (CC) in synchronisation with the network cycle structure. (Actually, two CCs—one for each voice class—are maintained per node). At the beginning of each cycle, the CC in each node signals the event. The next node to receive the token broadcasts a control packet (called a Cycle Poll) over the LAN. Within a field of the cycle poll packet, the node places the current contents of its CC (that is, the time elapsed since the CC signalled the cycle beginning). This field is used by the other nodes to check the synchronisation of their own CCs. The cycle poll signals the start of the cycle. The token then rotates once around the ring, servicing those voice packets assembled during the previous cycle. When token rotation is complete, the node broadcasts another control packet (called a Cycle Depoll) which signals the end of voice service and, consequently, the beginning of data service. In the unlikely event that the token fails to return to the node before the start of the next cycle, the Depoll (immediately followed by a Poll) is sent by the next node to receive the token. When this occurs, there may be some voice packets left unanswered at the beginning of the new cycle.

Rather than holding over to the next cycle voice packets not serviced in the current cycle, nodes flush unserviced packets from their buffers. Those packets are thereby lost. This is done, not because of lack of storage capability, but to enforce a strict upper bound on the voice delay. However, the likelihood of a packet going unserviced is made small by virtue of the dynamic boundary between voice and data services.

As part of the Telephone Package, a voice call is initiated subject to a voice admission policy. Under this policy (which is common to all nodes supporting the telephone service), a node will only initiate a new call provided the total number of active telephone users (those engaged in a call) on the LAN is below a given limit. This limit can be established in a number of ways. One way is to define a nominal voice service duration (called the nominal voice capacity) and a corresponding nominal data capacity. The limit for the voice admission policy is then that number of active telephone users which, on the average, use no more than the nominal voice capacity. This limit can be made known to the nodes by means of the Network Administration function discussed previously.

The boundary between voice and data service for each cycle is not fixed, but is allowed to move to suit the amount of voice capacity currently in use. Under heavy voice traffic (during the busy hour) much of the nominal voice capacity will be used for most of the time. However, unless the nominal voice capacity is made very nearly equal to the total system capacity, packet loss is rare. On the other hand, as soon as the current voice traffic has been serviced each cycle, the system is able to offer service to data. Hence any unused voice capacity is available to data. This means that for a large portion of the time (outside busy hour), data sources are able to use nearly the entire system capacity.

The alternative to a dynamic boundary is a static boundary. In such a case, the voice and data capacities are fixed. Hence, the voice service cannot encroach on the reserved data service, while data sources are unable to use any excess voice capacity. The static boundary effectively decouples the voice and data services, and in many respects is equivalent to the use of segregated voice and data switches.

As will be shown later the voice packet loss with a static boundary is substantially greater (by about an order of magnitude) than the packet loss resulting from a dynamic boundary with the same nominal voice capacity. For example, consider a system in which the nominal voice capacity is 80% of the total capacity and suppose that the system parameters are such that the nominal voice capacity can support 12 simultaneous talkers. While the static boundary yields voice loss in the order of 1%, the dynamic boundary has a voice loss of about 0.1%. This level of loss has been shown to be entirely negligible in regard to its perceived effect on speech quality (Refer to Ref 12). Alternatively, for a given level of voice loss, the dynamic boundary scheme has a greater voice carrying capability.

The data packet delay incurred in a static boundary system can also be shown to be significantly higher (by about a factor of 2) than for a dynamic boundary system. Furthermore, it can be shown that both static and dynamic boundary systems yield better delay and throughout characteristics than does a system servicing only data with a capacity equal to the data capacity of the mixed traffic systems.

Using the above example, during the busy hour when the full voice capacity can be expected to be in use, the data delay under a static boundary scheme is about 150% of the delay under the dynamic boundary when 80% of the available data capacity is used by data sources. Furthermore, the disparity rapidly increases as more of the total capacity is used by voice.

The cycle structure under the cyclic service scheme has a free (as opposed to fixed) format. This means that neither is the length of data packets fixed, nor is the position occupied by individual voice sources within the voice service. The benefits arising as a result of the free format are similar to those due to the dynamic boundary, as discussed next.

When no constraint is imposed on the size of data packets, other than the imposition of a certain minimum and maximum due to protocol and buffering considerations, a significant improvement to data service utilisation is realised. Since data messages rarely have a length equal to an integral multiple of some unit packet size, if the packet length is fixed then at least one packet per message must be "padded out". The detrimental effect on utilisation is particularly severe when the messages are short, since the number of fully used packets per message becomes small. However, short messages are the norm in LAN-based applications, arising as a result of interactive keyboard-driven communications. Examples include text editing, electronic mail, data-base query and response, and so on.

These applications are characterised by long holding times and low average data rates, but with bursts of activity consisting of the interchange of short messages. The extreme case is character-oriented communication in which messages consist of single (or small groups) of characters. This occurs, for example, when a terminal is "logged" onto a remote host, and character-by-character echo is required. Even using short packets with a fixed length of 200 bits, as much as 96% of each packet goes unutilised.

Voice sources engaged in conversation generate packets during one cycle for service during the next. The order in which the sources are served during the cycle depends only on the starting point of the token within the cycle, and the layout of the LAN. Since there are no pre-assigned locations within the voice service for specific voice sources, the use of speech interpolation is readily accommodated. If a voice user is currently silent, then no packet is transmitted during the cycle (however, it should be noted that the node continues to assemble packets during silent intervals in order to catch the beginning of the next talkspurt). When the token arrives at the node during the voice service, the token is passed without serving a packet, hence reducing the duration of the voice service and increasing the effective data capacity. When the user returns to talkspurt and begins generating servicable packets, the increased voice service is accommodated by borrowing back the capacity previously made available to date. The voice admission policy keeps track of the number of voice users, not just those in talkspurt. This, together with the dynamic boundary, means that the chance that a user, on return to talkspurt, finds no available voice capacity is made almost negligible.

Each node supporting a telephone service provides a dynamic speech detection algorithm (Refer to Ref 24).

Rather than basing detection of a talkspurt solely on the absolute level of speech, the relative change of level is employed as a detection parameter. The resulting attack time of the detector is typically two or three samples (where "sample" is used in the PCM sense) and the embedded points at which the relative level is checked coincides with the start of each cycle. This means that even if the talkspurt begins near the end of a cycle, a packet containing the beginning of the talkspurt can be transmitted by the node. Furthermore, since detection is based on relative level, it is insensitive to individual talker characteristics, as well as being able to catch talkspurt beginning with fricatives such as "s".

The analog voice signal produced by a telephone user engaged in conversation is continually encoded and assembled into packets by the node. Completion of packet assembly coincides with the start of each cycle, as determined by the node's CC. A packet assembled during the current cycle is therefore serviced during the next. As explained earlier, in the rare event that a packet is not serviced, it is flushed from the node's buffer. This means that the time spent waiting for a transmission varies, but is strictly bounded by the cycle duration.

The end-to-end delay D seen by a voice packet is the sum of the packetisation delay and the transfer time $T_F$, that is $$D = T + T_F \text{ secs} \qquad (2)$$

where T is the cycle duration (equal to the packetisation delay). The transfer time is defined as the elapsed time between when a packet is assembled at the transmitter and when it is disassembled at the receiver.

If the transfer time is allowed to vary, so too will the end-to-end delay, with the result that voice output at the receiver will be discontinuous, a condition known as, called "glitching" (Refer to Ref 25). To overcome glitching a method must be employed to smooth the delay variance. This is done by introducing, into the receiver, a delay $D_R$ which augments the transmission delay $D_r$ such that the transfer delay $$T_F = D_R + D_r = T \text{ secs} \qquad (3)$$

is a constant. The introduced delay $D_R$ is bounded by T. This variance smoothing technique is an implementation of Minoli's "Receive End Buffering" with "Limited Waiting for Late Packets" (Refer to Ref 26).

Variance smoothing is implemented as follows. When a packet is transmitted, it is read into the receiver's buffer. However, disassembly is deferred until the beginning of the next cyle. The end-to-end delay is therefore equal to twice the cycle duration. The voice signal reproduced by the receiving node is essentially continuous. There are, however, two possible sources of discontinuity.

At the beginning of the next cycle, if the receiving node has not received a packet from the transmitter, it assumes the packet was not sent because the source voice user has gone quiet. Silence is then supplied to the destination user by effectively grounding the receiver's output. If, however, the packet didn't arrive because it was not serviced, an artificial pause in the recovered speech signal results due to the effective replacement of the missing packet by zeros. While a number of corrective actions to overcome this occurance are possible (for example, the use of Odd-Even Interpolation proposed by Jayant (Refer to Ref 11), they are considered unwarranted in the LAN architecture for the following reasons:

(i) the dynamic boundary scheme reduces the chance of packet loss to levels well below 1%, except when the norminal voice capacity is made nearly equal to the system capacity (which would also result in poor data throughput). With a 1% loss level, the effect on perceived speech quality is barely noticeable, particularly since the voice segment duration has been selected to be only 16 ms (as discussed in section 2.1.4).

(ii) the mechanism of voice loss in the LAN produces "mid-spurt" clipping (Refer to Ref 9). This means that voice loss may occur anywhere within a talkspurt, as opposed to being grouped at the beginning of the talkspurt. The latter is called "front-end" clipping and is characteristic of the TASI system (Refer to Ref 27). Mid-spurt clipping is less objectionable since the average clip length is considerably less than with front-end clipping.

(iii) the cyclic service scheme maintains a well defined time relationship between packets, even if a packet is lost. This means that no temporal shift of talkspurts occur. It also means that the use of "Time-stamping" is not required.

The ability of the cyclic service scheme to eliminate the effect of delay variance on speech continuity depends on the source and destination nodes having the same perception of the cycle duration. For example, if the destination's CC runs slower than that of the source, packets being disassembled by the receiver may be "back-end" clipped due to the premature arrival of the next packet. Similarly, if the destination's CC runs faster, then pauses may be inserted between the receiver's disassembled packets.

However, the LAN architecture of the present embodiment is designed so that each node's CC (and for that matter, the packet disassembly and decoding process) is clocked from the ring's transmission rate. As will be detailed later all unbypassed nodes are mutually synchronised to the ring rate. Hence, the clock rate of each CC is strictly equal on average. There may be instantaneous differences in the ring rate in various segments of the ring, but the CC cycle period is sufficiently large to "fly-wheel" over those differences (for example, a 1M bit/sec system with 16 ms cycle contains 16,000 bits per cycle), switch is a traditional PABX. The packet switch is provided for switching the remaining data communications and would be realised as a LAN. The front-end multiplexor shown in FIG. 3.1 provides the users with the appearance of an integrated system. The figure, as shown, is intended to represent the concept of an integrated system employing separate circuit and packet switches, rather than a specific implementation of such a system.

Spatial separation of circuit and packet switching is equivalent, from the viewpoint of switch utilisation, to the static boundary scheme discussed in the previous section. With a static boundary, circuit and packet switching are separated in time. In each case (spatial and temporal segregation), each switch is given a static capacity. No "borrowing" of capacity between the switches is allowed, as it is with a dynamic boundary. In particular, for given circuit and packet capacities, the voice and data performance are poorer for the segregated scheme than for the dynamic boundary scheme employed by Xlnet.

There are other consequences arising from the spatial switch separation. The most obvious is the need to provide and maintain two switches instead of one, resulting in the duplication of wiring and the division of responsibilities within the local communication environment.

Another, less obvious, consequence is that packet transmission time is greater, since the transmission rate of the packet switch is less than the transmission rate of the combined switch (with either type of boundary). In a LAN environment, where messages are typically short and generally occupy single packets (assuming variable length packets), this can be significant, particularly when voice traffic is light. As an example, if the combined switch is designed to have a nominal data capacity which is 20% of the total capacity, then the transmission rate is five times greater than for a separate packet switch with the same data capacity.

Finally, since the circuit switch will not normally use speech interpolation, the PABX switch capacity therefore must be twice that of the nominal voice capacity of Xlnet. If speech interpolation is employed, then for the same nominal capacity, greater voice loss is encountered than is the case with Xlnet.

Allocation of circuit bandwidth to voice users in Xlnet is achieved in a decentralised manner using the mechanisms of the voice admission policy and the cyclic service scheme. An alternative approach is to allocate circuits using a central facility, as represented in FIG. 3.2. The figure shows a combined circuit-packet switch with nodes connected via a ring. (This representation is, to a large extent, arbitary. The nodes could also be connected via a bi-directional bus, or a pair of unidirectional buses of the form employed by Fasnet [17]. At least one proposal for such a system using unidirectional buses has recently been made [28]). The major difference between this system and Xlent is that, in the former case, circuit allocation is made by the central processor, rather than the nodes.

In such a system, a node wishing to initiate a voice call does so by requesting a circuit from the central processor. If available capacity exists, the processor allocates a circuit by storing the addresses of the calling and called nodes. On a regular basis, the processor scans its list of addresses and sends empty packets to each of the nodes whose addresses are held in the list. A node, having been allocated to a circuit, is then required to transmit a voice packet periodically by filling the empty packet addressed to it via the processor. Each packet occupies a fixed timeslot so that this periodic generation and reception of pre-assigned packets can occur. Any spare slots between the pre-assigned slots are made available to nodes carrying data traffic.

The system, as described, has a number of limitations. Firstly, once the circuit is allocated, the processor periodically generates the pair of pre-assigned timeslots without regard for whether the node has a packet to transmit or not. The implication is that speech interpolation is not supported. Therefore, the voice carrying capacity is less by a factor of two compared with systems permitting the use of interpolation. It also means that bandwidth which could otherwise have been "borrowed" by data is essentially wasted, transmitting silence intervals. This also leads to higher data delay.

A second objection is that fixed timeslots require fixed packet lengths. As has already been discussed, this is a significant source of under-utilisation in a LAN-based application for mixed traffic.

A final problem concerns reliability. The central processor represents a "prime-failure" site. Since the processor is responsible for circuit establishment and clear-down, failure of the processor means, at least, loss of the telephony service. A standby processor would have to be provided, which could take over following a prime-failure. However, since the standby would otherwise require time to gain the state knowledge lost by the duty processor, the standby would have to be a "hot duplicate" running in parallel with the duty processor. There would also need to be an arbitration unit capable of deciding which processor is in error should a discrepancy occur during normal operation.

In the Xlnet architecture, no such prime-failure site exists. The mechanism supporting the various services are decentralised and are common to each node. Individual node failures are handled by bypassing and reconfiguration. If a node senses incipient problems, it can gracefully exit the ring bypassing itself (after broadcasting a "Here-I-Go" control packet, if it is able to do so). If, however, the node is unable to bypass itself, then it can be forcibly ejected from the ring, by the adjacent nodes, and await repair.

To ensure that the system is secure against node failure, our architecture is designed so that all essential link-control functions (that is, control functions of the lower two OSI layers) are decentralised. Such functions include bit synchronisation, cycle synchronisation, and token maintenance.

The previously referred to, seven-layered architecture of the Network Protocol has the structure shown in FIG. 10. Since the LAN is intended to support mixed voice and data traffic, some applications will require synchronous service, while others will not. Due to delay constraints imposed by synchronous service, the only reasonable level at which to provide service integration is the access control level (2a). This conclusion is independent of network details as has been observed by a number of authors (Refer to Ref 29).

Synchronous applications are best served with a connection-less type of operation at the packet level. To do otherwise incurs delay penalties associated with sequence and flow control. The processing overheads involved with connection-oriented services are large compared with connection-less operation. This is particularly true of synchronous services, such as voice, where packets are generally short (to reduce packetisation delay) and the volume of packet flow is large (10K-20K packets per conversation).

The use of connection-less operation for synchronous services is prompted by the nature of the applications. Packets resulting from a synchronous application must, in general, be delivered within a strictly bounded time. There is no mert in transmitting a voice packet past the deadline. However, the redundancy carried by voice packets is large, meaning that the service is tolerant to loss of packets. It has been found (Refer to Ref 12) that 1-5% of voice packets can be lost with little effect on intelligibility.

On the other hand, many non-synchronous applications require a connection-oriented service at the packet level. These applications require a transport service which provides full sequence and flow control.

For these reasons, the LAN's Network Service (layers 1-3) is designed to provide an efficient and reliable connection-less service which is common to the various applications. Integration of synchronous and non-synchronous services occurs at the Medium Access Sublayer. It is the responsibility of the Transport Layer to bridge the gap between the required Transport Service and the Network Service. Therefore, applications requiring connection-oriented service use a Transport Layer which supports the necessary flow and sequence mechanism.

The individual protocol levels of FIG. 4 will now be discussed in greater detail, commencing with the physical layer 1 which is defined in terms of:

(i) bit level synchronisation
(ii) line code
(iii) transmission medium
(iv) electrical interface Three fundamentally different methods were considered for achieving bit level synchronisation between the nodes of the ring. With the open loop method of synchronisation, only one node is actively transmitting a packet at any moment in time. The other nodes regenerate and receive the transmission and hence the "ring" can be considered as a string of repeaters with a transmitter at the head. The transmission rate can be determined by the transmitter, with the remaining nodes deriving cynchronisation using, for example, phase-locked loops (PLLs). This method, however, has a number of drawbacks.

Transmission rate will vary, possiblly considerably, as different nodes take turns transmitting when the open loop method is used. This leads to difficulties with regard to PCM jitter and synchronisation of the node's cycle clocks. A further disadvantage is that a lengthy preamble (or "training sequence") would be required in the header of each MAC frame to allow the receiver to lock onto the transmission.

While the open loop method is used in the Ethernet and IEEE Token Bus standards (Refer to Ref 14 & 7) it was rejected for use with the architecture of the present embodiment.

A second possible method of synchronisation is the Master Clock Method. In this scheme one node is chosen to act as the ring's timing generator while the remainder of the nodes use second order PLLs to recover the timing information. For stable operation, the phase change around the ring must be an integral multiple of $2\pi$ (equivalent to saying that an integral number of bits must fit onto the ring). This, together with the need to absorb phase jitter, requires the existance of an elastic buffer on the ring (preferably at the master clock node).

A major problem with the method is the requirement of a prime-failure site. This is not in keeping with the objective of the preferred embodiment to decentralise all link-control functions of the ring nodes. The method has been further developed by both IBM and the IEEE Token Ring Standard (Refer to Ref 30 & 8) to duplicate the master node function in each ring node. However, the resulting protocol overhead is high, and the method was not selected for use with the present embodiment. Finally the third method of synchronisation considered for use with the present embodiment was the Mutual Synchronisation (or Closed loop) method. With this approach each node transmits a synchronising signal to its immediate down-ring neighbour, and this clock is, itself, synchronised to the immediate up-ring node. Hence a closed loop of mutually coupled PLLs results, with the ring locking to the mean rate. The resulting steady-state clock rate converges to the nominal transmission rate.

When first-order PLLs are used, such a scheme is stable (Refer to Ref 31). In fact, the closed-loop nature of the method yields a jitter spectrum which approaches that of a double-ended scheme (a scheme in which each node is locked to the mean of its two neighbours). Increased loop bandwidth (and hence locking range) improves stability (Refer to Ref 32).

A further benefit resulting from the use of first order PLLs is that each PLL can maintain a stead-state phase error which will absorb any non-integral bits around the ring. In effect, the PLL in each node acts as a single bit elastic buffer.

This method of ring synchronisation is used in the ProNET system (Refer to Ref 6) and has been selected for use in the present embodiment of the invention.

Referring now to the selection of the likne signal encoding method, a commonly used line code is Non Return to Zero Code (NRZ) since the data rate (bits per second) equals the baud rate (symbols per second). However, NRZ is not a self-clocking code, and has frequency components which extend to D.C.

A general class of self-clocking line codes is the Biphase family. Three codes within that class are in common use: Manchester, Biphase-M (Mark), and Biphase-S (Space). Since they are self-clocking it is a straightforward matter to extract timing information. Furthermore, Biphase codes do not require a dc-coupled transmission.

Data and timing information are carried by the transitions. With the Manchester code, a transition always occurs in the middle of a bit (giving timing), while the "sense" of the transition gives the datum value. In Biphase, a start-bit transition gives timing, while the presence of a mid-bit transition gives the datum value (a one for Biphase-M, a zero for Biphase-S).

While Manchester and Biphase appear to be similar, Manchester suffers from a phase ambiguity which doesn't exist in Biphase. For example, if the encoded line signal consists of alternating highs and lows (each of duration high-bit), a Biphase-M decoder yields a string of zeros (ones for the Biphase-S), while a Manchester decoder would produce either a string of zeroes or ones depending on the previous history of the signal. This differences is important in the LAN application since flag and token symbols (see section 6.5) contain a string of ones, and the quiescent line condition also corresponds the consecutive ones. Hence, if a noise burst hits the line, a Biphase coded signal will recover faster than a Manchester coded signal.

Before a node which was temporarily out of service can re-enter the ring, it must first synchronise to the ring's transmission rate. This process is facilitated if the line signal, to which the node is attempting to synchronise, contains only timing information. Such a signal corresponds to a data stream of alternating ones and zeros for Manchester, a string of ones for Biphase-S, and zeros for Biphase-M. Since the quiescent line conditions is consecutive ones, a Biphase-S decoder can be quickly synchronised without the need for a special training sequence. and accordingly the use of Biphase-S as the line code was chosen for the present embodiment of the invention.

Turning now to transmission medium, of the possible media available, three are commonly encountered in local communication systems; optic fibre, coaxial cable, and twisted pair cable. Each has merits and demerits, making a final choice dependent on local conditions.

Optical Fibre offers very high bandwidth (500 MHz or more depending on fibre type), high immunity to inerference, and security against tapping. On the other hand, bypassing faulty nodes, or ring segments, in an optic ring is more difficult. Optic switches are expensive, slow to operate, and have a high insertion loss. Optical-to-electronic and electronic-to-optical conversion can be done at the node's ring interface, thereby allowing electronic bypassing. However, that begs the question of how is an electronic failure bypassed.

Cable is easier to bypass than fibre, has a moderately large bandwidth (50–300 MHz), and can be readily used as a bus with node attachment via passive ("vampire") taps. However, this also means that coaxial cable is prone to "eavesdropping". Another problem is the generally large diameter and lack of flexibility of cable (for example, Ethernet cable resembles a garden hose filled with sand). This tends to make cable installation more difficult. ti+7 Twisted pair, such as four-wire telephone cable, often already exists in establishments to which the LAN is applicable. The pairs generally extend from satellite (wiring) cabinets to many of the offices in which LAN nodes would be located. It may be possible to configure such cabling into a wiring plan suitable for the LAN ring segments. Since techniques for wire installation and maintenance are well established, connectors are inexpensive and employees with experience and skills on voice networks can apply those skills to the LAN without retaining. However, twisted pair has a considerably lower bandwidth than either fibre or coaxial cable, and the length of wiring hops for reliable communication is restricted. However, by using balanced differential line transceivers, useful transmission rates (up to 20M baud) over distances suitable for the LAN (up to 300 meters) per hop are achievable (Refer to Ref 33) Additionally, the two wire pairs in telephone cable suit the fault recovery scheme of the LAN architecture.

As a result of these considerations, twisted pair has been chosen as the transmission medium for the present embodiment of the invention. However, in networks covering larger areas, Coaxial Cable may be preferable and given the degree of progress in optical fibre components an optical fibre version of the invention may be preferable in the future.

Given that twisted pairs are to be used as the transmission moedium, there are a number of interface standards suitable for the point-to-point communication requirement of the LAN. In particular, the EIA standard RS-449 defines a balanced interface, the RS-422 (Similar to the CCITT recommendation X.26).

The RS-422 guidelines (Refer to Ref 34) cover transmission rates up to 10M baud. At 2M baud, over 24 AWG twisted pair with a worst case termination of 100 $\Omega$, RS-422 allows 60 meter hops. With proper termination the hop length may be extended to about 100 m.

Considering that RS-422 (and CCITT X.26) is an established standard, with low cost differential transceivers available from several manufacturers, this interface was selected for use in the physical layer of the present embodiment of the invention.

The Medium Access Control (MAC) of the Network protocol performs the following functions enumerated in the IEEE 802.4 recommendation.
 (i) lost token timer
 (ii) distributed initialisation
 (iii) token holding timer
 (iv) limited data buffering
 (v) node address recognition
 (vi) frame encapsulation
 (vii) FCS generation and checking
 (viii) Valid token and frame recognition (ix) new ring member addition (x) node failure error recovery In addition to these recommended functions, the MAC sublayer implemented in the present embodiment of the invention performs the following additional functions:

(xi) generation of ring topology map (xii) link failure recovery (xiii) cycle and subcycle timers (xiv) cycle synchronisation.

The internal MAC structure is conceptually divided into seven logical 'state-machines' as shown in FIG. 11.

The Interface Machine (IFM) 41 interfaces between MAC 2a and LLC (Logical Link Control sublayer) 26. Link layer service requests are interpreted and queued by the IFM 41 and the mapping between the LLC's "quality of service" and the MAC "class of service" is performed.

The Access Control Machine (ACM) 42 handles the bulk of the MAC 2a functions such as token maintenance, token recovery, token passing, non-synchronous priority control, and ring membership.

The Cycle Control Machine (CCM) 43 establishes and maintains the network cycle timing, and controls the type of frame (voice, data etc) which the ACM 42 may currently transmit to the ring.

The Receive Machine (RXM) 44 accepts the bit stream from the physical layer 1, assembles it into frames, validates them and passes them to the higher level machinery. The RXM 44 recognises frame delimiters, checks the FCS, and validates the frame structure.

The Transmit Machine (TXM) 45 takes a frame from the ACM 42, envelopes it with delimiters, inserts the Frame Check Sequence and sends the frame to the physical layer 1 as a bit stream.

The Regenerative Repeater Machine (RRM) 26 is enabled whenever the node is in Repeat mode. The RRM 46 copies the bit stream arriving on the receiving link to both RXM 44 and, after a one bit delay, to the transmitting link of the Physical Layer 1. When RRM 46 is disabled, the TXM 45 drives the transmitting link directly.

The Bypass Control Machine (BCM) 47 controls the nodes connectivity to the ring. The BCM bypasses the node when in the Bypass Mode, and reconfigures the node's link connections to recover from link failure.

The machinery outlined above is, based in principle on 802.4, with the addition of the CCM 43 and BCM 47.

Under the MAC protocol, the node can operate in one of several modes, as shown in FIG. 12.

The first mode is the Bypassed Mode 51 wherein the node is effectively removed from the ring. It is not an active ring member, and is not shown in the ring topology map held by the other nodes. A node which is "powered-down" is in Bypass Mode. Similarly, following power-up, while the node undertakes self-testing and attainment of synchronisation, it is Bypassed. A node re-enters this mode prior to power-down, and when wishing to remove itself from the ring (for example, to do self-testing). While in this mode, the node may receive ring transmission, but cannot initiate a transmission.

The second mode under MAC protocol is Unbypassed Mode 52 and a node enters the ring by moving from Bypassed Mode to Unbypassed Mode, and becomes an active ring member. Once a node is an active ring member it participates in token passing, and is required to cooperate with the other (unbypassed) nodes in maintaining link-control functions.

The third node under MAC protocol is Repeat Mode 53 in which the respective node acts as a regenerative repeater in the ring. All ring transmissions pass through the nodes in Repeat node and incur a small (1-2 bits) delay.

The fourth node under MAC protocol is Non-Repeat Mode 54 which is used during initiation of a transmission on the ring. Generally, this occurs after the node has found the token. However, in special cases (for example, when recovery of a Lost Token is required), a node may enter Non-Repeat Mode withoutfirst receiving the token.

As well as the MAC protocol modes referred to above, Cycle Control Machine places the node places the node in either Synchronous 53 or Non-Synchronous 56 mode depending on the current state of the network cycle. If in the Synchronous Mode, the node may only transmit Synchronous frames; the converse is true for non-synchronous mode. Within Synchronous mode, there are two sub-modes: Long and Short (not shown in FIG. 12) which relate to the Long Poll Cycle and Short Poll Cycle referred to previously.

The frame formats and components that are considered valid by the MAC sublayer will now be discussed. The MAC Frame has the following format:

| First Bit Transmitted |
| --- |
| FLAG DDTE SDTE FG DATA-UNIT FCS FLAG where<br>FLAG = frame delimiter (1 byte)<br>DDTE = destination DTE address (1 byte)<br>SDTE = source DTE address (1 byte)<br>FC = frame control (1 byte)<br>DATA UNIT = information, generally of the Logical Link Control Sublayer.<br>FCS = frame chech sequence |

The Start and End of Frame Delimitation is performed by a unique flag symbol having the following bit pattern:

Flag: 0 1 1 1 1 1 1 0

Flag uniqueness is assured by the use of a zero-insertion technique (also known as "bit stuffing") whereby if a string of five consecutive "1"s is detected during transmission, a "0" is inserted after the fifth "1". Conversely, a station receiving five consecutive ones will test the next bit and if it is "1" the receiver will look for the remainder of the flag. If a "0" is detected, the receiver will know that this was inserted during transmission and ignore it.

The destination and source addresses DDTE and SDTE are each 8 bits long. A DDTE of 255 represents a global, or broadcast, address to all nodes on the ring. Group addressing is achieved as follows: during the set-up of a group connection (for example, a telephone call), one address of the grouped nodes (e.g. the highest address) is established as the group address. For larger systems, requiring an address space of more than 255, the address fields can be expanded to 16 bits each.

The FC distinguishes the various frame types:

MAC control

LLC data

MAC Management data reserved.

The FC corresponding to a MAC control frame has the following form:

| First bit transmitted |
| --- |
| FC: 0 0 C C C C C C | where the first two bits indicate the type of frame (in this case of MAC control frame), while the remaining six bits have the following meanings:

| | | |
| --- | --- | --- |
| 000000 = | Claim-Token | (CT) |
| 000010 = | Cycle-Poll | (CP) |
| 000011 = | Cycle-Depoll | (CD) |
| 000100 = | Reconfigure-Up | (RU) |
| 000101 = | Reconfigure-Down | (RD) |
| 001000 = | Who-Follows | (WF) |
| 010000 = | Here-I-Am | (HA) |
| 010001 = | Here-I-Go | (HG) |

The remaining frame types (LLC data etc) are as defined by IEEE 802.4.

The Frame Check Sequence (FCS) is a 16 bit cyclic redundancy code using the HDLC generating polynominal $(x^{16}+x^{12}+x^5+1)$. Coverage of FCS is from the first bit of the DDTE address to the last bit of the Data-Unt, inclusive.

The token is a unique symbol (guaranteed by zero insertion) of the form:

Token: 0 1 1 1 1 1 1 1.

The token is converted to a Flag by inverting the last bit. Hence, the token becomes the opening flag of the next packet to be transmitted. This choice of token symbol conforms with the SDLC protocol's "go-ahead" command.

A node may retain the token, without actually transmitting a frame, by transmitting consecutive flags.

Further, as the quiescent line condition (the line idle-condition) is consecutive ones, when a node has finished transmitting the closing flag of the last frame, it will return the line to its line-idle condition. The next node may then interpret the trailing zero of the closing flag (followed by a minimum of seven ones) as being the Token.

The token passing scheme is diagramatically illustratd in the ACM State Transition Diagram shown in FIG. 13, in which an unbypassed node in the repeat mode 53 is in state 62 (idle). The bit stream arriving on the incoming link of the idle node is repeated to the outgoing link via the RRM 46. Concurrently, the RXM 44 scans for either a flag or a token. When a token is found, it is either passed onto the next node if no frames are in the queue, or else the node accepts the token (state 63). This is done by changing the trailing one of the token to a zero, forming an opening flag. The node then changes to non-repeat mode 54, and transmits the remainder of the frame (state 64). Other queued frames may be sent following the first (state 64 and 65) according to the MAC class of service protocol Following the closing flag of the last frame, the token is released (state 66), however, the node remains in non-repeat mode 54 until it receives (and removes) its own frame (state 67), at which time it switches to repeat mode 53 It should be noted that since the token is released immediately following the end of transmission, the protocol employs Multiple-Token operation (Refer to Ref 13)

Initialisation of the token is required at system power-up, or following a catastrophic system failure when the token is lost (for example, if the system is hit a noise burst) and the two conditions (initialisation of token and replacement of lost token) can be grouped together under the heading of Lost Token Error.

Each ACM 42 possesses a Lost Token Timer which has a time-out period greater than the maximum token rotation time (see Appendix F). Whenever a node begins waiting for a token, its ACM 42 starts the timer. If the token arrives before time-out, the timer is stopped. If timeout occurs before the token arrives, the node switches to non-repeat mode 54 and enters state 68. In this state, the node sends a "Claim-Token" (CT) MAC Control frame, and flag-idles. The CT is globally addressed and has the node's own address as the source. Other nodes may have also experienced Time-out and have sent CTs (if not, the node's CT will propagate immediately around the ring). These nodes are said to be participating in the error recovery. While a participating node is idling, it continues to monitor the incoming stream for the arrival of a CT. If time-out again occurs prior to a CT arrival, another CT is sent. (This resending of the CT is allowed to occur only for a pre-determined number of times before higher layers are notified of a system failure). When a CT arrives, its source address is compared with the node's own address. If equal, the node has succeeded in claiming (that is, re-establishing) the token. It releases the token and returns to state 62. If the address is less than its own, the CT is again retransmitted, with the source address equal to the node's own address. On the other hand, if the address is greater than its own, it transmits the CT, with the source address unchanged, and returns to state 62. The net result is that eventually all but one of the CTs (the one with the highest address) will be filtered out, leaving one node with the right to release the token.

When a node has finished its transmission, it releases the token and waits for the last frame it sent to arrive before switching to repeat node. If a frame other than its own returns, a Duplicate Token has been detected. Recovery from the Duplicate Token Error is handled by effectively forcing a Lost Token Error, as follows.

Upon detection of a Duplicate Token Error, the node is in non-repeat mode 54. Hence, it is able to absorb any frames arriving as a result of the duplication. If the only frames to arrive are the duplicate tokens themselves, these are absorbed and the problem is solved. (This would be verified by the ultimate arrival of the node's own frame). If, however, a frame other than the node's own frame (or a token) arrives, this implies that at least one other node is involved in the Duplicate Token Error. The node therefore proceeds to send a CT just as it would if its Lost Token Time-out occurred. Recovery proceeds as already described for Lost Token Recovery.

Following power-up (state 61), a node may wish to enter the ring by entering state 62 (the Idle state). Before doing so, it undertakes self-testing, attains bit and cycle synchronisation, and waits for the token. If the token fails to arrive, the node participates in Lost Token recovery, as discussed previously.

When the node enters state 62, it once again waits for the token to arrive. Following token arrival, the node proceeds to generate a ring topology map for each node as follows.

The node transmits a "Who-follows" (WF) MAC Control frame on its first entry to state 63. The WF is immediately followed by the token. Having removed the WF when it returns (and the node is once again in state 62), the node will find a stream of "Here-I-Am" (HA) MAC Control frames following, one from each unbypassed node, in the topologised order of the nodes themselves. By storing the SDTE of each frame, in order of arrival, the node has built up a topology map of the ring. At the end of the stream is the token. The node uses the token to send its own HA frame. That completes the node's admission to the ring.

A node, upon receiving the WF, behaves as follows. It stores the SDTE of the WF frame and any HA following. When the token arrives, it sends its own HA frame and then continues storing the SDTE of each HA frame until the SDTE equals the first address stored. That completes the "Who-follows" operation. At this point, the node also has a complete ring topology map.

Hence the transmission of a WF frame by a newly arriving node produces an updated topology map in every node of the ring. When a node leaves the ring, it issues a "Here-I-Go" frame which is used by the other nodes to amend their maps accordingly. The ring topology map is useful for detecting duplicate addresses, failed nodes and allowing rapid location of cable failures.

The Interface Machine IFM 41 maintains a number of queues for the data frames awaiting transmission. The queues are classed as synchronous or non-synchronous. Within the synchronous class, there are two subclasses: Long and Short. Within the non-synchronous class, there are up to six priority levels. The LCC 26 provides for 8 "qualities of service", and the mapping between these and the MAC's "class of service" is performed by the IFM 41.

When a synchronous frame arrives from the LLC via one of the service access ports (SAPs), it is placed at the head of the appropriate queue (Long or Short as appropriate). On the other hand, a non-synchronous frame is placed at the tail of its appropriate queue. As a result, the synchronous queues are served on a LCFS (last come first served) basis, while the servicing discipline for the nonsynchronous queues is first come first served. Furthermore, the frames, within each synchronous queue, are also distinguished on the basis of the SAP identity (IEEE 802).

The CCM provides a function called MODE for use by the ACM. MODE returns the value DATA when ACM is allowed to send non-synchronous data frames. If MODE returns LONG, ACM can transmit local voice frames; similarly, SHORT implies junction voice frames.

If MODE returns LONG when the token arrives, the ACM transmits a frame from each distinct SAP within the IFM's LONG queue. (Similarly if MODE is SHORT). Any frames remaining in the queue are flushed out. The result is that at most one frame (in fact, the most recently assembled frame) from each SAP is transmitted each cycle. If a frame is not transmitted, it is effectively replaced by the next one to arrive from the same source.

The Class of Service Operation for non-synchronous frames conforms to the priority option defined by the IEEE 802.4 standard (Refer to REF 7) with one difference. The token inter-arrival time, which is used by 802.4 to determine the current offered data load in order to decide whether a given priority can be transmitted, is only calculated for those token rotations with MODE equalling DATA.

The Cycle Control Machine 43 (CCM) cooperates with the other CCMs on the ring to control the network cycle timing. It does so by maintaining two Cycle Clocks (CC's); one having a Long (16 ms) cycle, the other with a Short (4 ms) cycle. The CC's are derived from the ring's transmission rate and can be advanced or retarded, by a node if found to be lagging, or leading, the network cycle timing. The result is that the CCS remain synchronised to the network cycle.

Referring now to the CCM state transmission diagram shown in FIG. 14, While the node is in the Bypassed Mode 51 it attains both bit and cycle synchronisation. When the node becomes unbypassed 52, MODE is equal to DATA (this is evident from the earlier discussion of the "Who-follows" operation—a newly arriving node sends a non-synchronous WF frame, hence implying the mode is currently non-synchronous).

When either CC times out, the CCM 43 moves to state 72 and waits for the token. Meanwhile the CC continues timing and following token arrival (state 73) the node sends a Cycle-Poll (CP) MAC Control Frame. The first bit of the Data Unit indicates whether the poll cycle is Long or Short. The remainder of the Data-Unit (15 bits) contains the current value of the respective CC (in bits). Hence, this field represents the time that the node spent waiting for the token since the CC timed out. As well as transmitting the CP, the node pushes the current MODE value onto the mode STACK, and sets MODE to the new cycle type (either Long or Short).

When the CP arrives at the other nodes (State 75-77), their MODE values are also pushed, and set to the cycle type contained in the CP. Thus, all nodes are kept in unison with regard to the service class currently being served by the ACMs 42. In addition, each node takes the difference between the time field in the CP and the node cycle clock (that is, the one appropriate to the poll-cycle type). The result is then time-averaged (first order digital filter) and used to advance or retard the CC. This algorithm is depicted in FIG. 15. As can be seen, the process is a first order PLL which results in the node's CCs being kept in synchronisation with the network cycle.

When the token has rotated around the ring and returns to the node which sent the CP (state 78), that node then sends a Cycle-Depoll (CD) MAC Control frame. (Note that a Short poll cycle (or cycles) may have been embedded within this cycle if it had been a Long poll cycle). Additionally, the node pops the mode stack, thereby returning MODE to its previous value. Similarly, each node, upon receiving the CD (state 76), likewise pops the mode stack. This use of the mode stack allows many nested poll cycles to exist. Hence, if desired, the scheme can be expanded beyond the two (Long and Short) currently envisaged.

The state diagram (FIG. 14 shows an additional transition from state 6 to state 8). This takes place if the token arrives at a node which is waiting for the end of the current subcycle. In this event, the node sends the CD itself.

As a final point, each node counts the number of frames sent over the ring within each poll cycle. This number is used by the voice admission policy of the Telephone Package to determine the current level of the offered network traffic.

The connection-less type of operation required by the link layer of the architecture is equivalent to the Type 1 service supported by the IEEE 802 Logical Link Control Protocol. Hence, the LLC sublayer can be provided by the 802.2 Class 1 protocol (Refer to Ref 19).

The OSI Connection-less Network Protocol (Refer to Ref 20) can provide the connection-less service required by the Network Layer of the LAN. This protocol offers a datagram service with a number of optional features (such as fragmentation) and an error reporting capability. For application in the embodiment described herein, most of these options can be omitted, resulting in a simple and efficient network protocol.

While the Transport Layer is not strictly part of the network service, the connection-less operation of the network means that special care must be taken when selecting a transport protocol for a given application. Application packages which require a connection-less oriented service can be supported by the OSI Connection-Oriented Transport Protocol (Refer to Ref 21). This protocol has five classes, with class 4 offering a full connection-oriented service in which Mechanisms for flow and sequence control are provided. The Transport Service is end-to-end, two-way, simultaneous, transparent, reliable, flow-controlled, and network-independent (Refer to Ref 23).

The Network Interface Unit (NIU 12) design is based on high performance devices from the Motorola MC68B microprocessor series and referring to FIG. 16, has a "dual-processor"-like architecture. All data transfer occur between the NIU's peripherals (TIU 13, LIU 11 and memory (RAM) 84), via the system bus 86 which runs at 2 MHz. Bus ownership is shared between the Microprocessor Unit (MPU) 81 and the (Direct Memory Access Controller (DMAC) 83.

The MC68B09 is a high performance MPU with a powerful, largely orthogonal instruction set supporting 8 and 16 bit processing. Features of interest in this application include multiple stacks, auto indexing and hardware multiplication.

Direct Memory Access between peripherals and memory is under the control of the MC68B44 (DMAC) 83. Besides allowing data transfer to occur up to a burst rate of 16M bit/sec, the DMAC can operate independently of the MPU 81, freeing The microprocessor to devote its time to processing, while the DMAC handles all routine data movement. The DMAC provides four independently programmable channels, two of which will normally be assigned to the LIU 11, while the other two will be assigned to the TIU 13.

When a peripheral (TIU 13 or LIU 11) requires the service of the NIU 12, it does so by asserting one of eight interrupt lines. These are processed by the Priority Interrupt Controller (PIC) 82 which provides hardware vectoring for the MPU. Thus, very fast interrupt response (about 6 μs) results.

Three independently programmable timers are provided by the MC68B40 Programmable Timer Module (PTM) 87. Typically, these timers are used for cycle control and token maintenance. The number of timers provided by the NIU 12 can be readily expanded with additional PTMs.

The RAM 84 provides up to 60K bytes of memory by 8 memory devices (each of capacity 64K bits). The top 4K of the address space is assigned to input/output ports, and to a 2K ROM 85 containing an initialisation routine. Following initialisation, any additional ROM (containing the Network software) can be accessed by the MPU by means of bank switching.

This NIU architecture is readily capable of throughputs up to 2M bit/sec (continuous) without the need for buffering in the LIU 11 (apart from a 3 byte latency buffer). Even with simultaneous two-way packet transfers between NIU 12 and LIU 11, the internal bus is used less than 50% of the time at 1M bit/sec. The NIU is able to handle a stream of packets arriving head-to-tail, subject only to queue limits in RAM. Hence, the NIU is able to handle 1000–2000 packets/sec. Throughputs in excess of 2M bit/sec (continuous) can be accommodated with the provision of transmission and reception buffers in the LIU (to remove the need for two-way simultaneous transfer between NIU and LIU). In this case, throughput is ultimately limited by the DMAC. However, provided a sufficiently fast LIU is used, burst rates far in excess of the DMAC's 16M bit/sec transfer rate are possible.

The block diagram of the Link interface unit (LIU) 11 is shown in FIG. 17 wherein the MC68B54 Advanced Data Link Controller (ADLC) 91 performs the functions of the RXM 44, TXM 45 and RRM 46 referred to previously. Running on the NIU's 2 MHz system bus, the ADLC 91 is capable of a maximum throughput of 1.5M bit/sec. It implements level 2 of the SDLC protocol, including the "go-ahead" command employed as the token in the present embodiment. If higher throughputs are required the MC68B54 may be replaced by a suitably faster ADLC is one is available. The transmit clock (Tx Clock) and Transmit Data (Tx Data) Signals from the ADLC 91 are combined in a clock encoder 93 to generate a down-ring link-signal 95 while the up-ring link-signal 96 is separated into Receive Clock (Rx Clock) and Receive Data (Rx Data) signals for the ADLC 91 by a clock decoder 92. The up-ring and down-ring signals are in turn interfaced to the up-ring link pair (14a,15a) and the down-ring link pair 14b, 15b by the bypass control 94.

The Clock Decoder 92 is based on the considerations discussed previously and is represented diagramatically in FIG. 18. The Transition Detector 101, comprising flip-flop 104 and Exclusive-OR Gate 105, responds to the start-bit transitions of the Biphase-S line signal and triggers monostable 106M in the Clock Extractor 102. The resulting output pulse has a duration which extends into the latter half of the bit call, thereby masking out the potential data transition. Hence, the monostable's output contains only clocking information which is used to synchronise the PLL 107 in the one-bit elastic buffer. Flip-flop 108 samples in the line signal during the latter half of each bit call, producing the recovered data signal which is latched by flip-flop 109.

The Clock Encoder 93, shown in FIG. 19, performs the complementary function to the Clock Decoder 92. Whenever one, or the other, of the inputs to gate 111 changes state, a transition is forced in the line signal. At start-bit, flip-flop 112 toggles due to the rising edge of Tx Clock which is buffered causing the start-bit transition. Similarly, at mid-bit, if Tx Data is zero, flip-flop 113 toggled by Tx Clock which is inverted by gate 115 and causes the mid-bit transition. If Tx Data is one at mid bit, the Q output of flip flop 113 is inverted by gate 116 thereby preventing the flip-flop from toggling. Hence, the line signal is Biphase-S encoded.

Bypassing of the node, and reconfiguration of the node's link-pairs, is performed by the Bypass Control circuit 94 illustrated in FIG. 20. The two-input multiplexors 121, 122 are independently controlled by the NIU 12 and allow selection of the source of the signal transmitted on either link-pair 14a, 15a, 14b, 15b either the node or the other link-pair. Also, the three-input multiplexor 123 selects the signal received by the node from either one or the other link-pair. As a result, the link-pairs can be either connected in the unbypassed mode, through-connected, thereby Bypassing the node, or reconfigured to receive on one half of one link pair and transmit on the other half of the same link pair, in the case where the other link pair has failed.

In addition, when the node is Bypassed, the three-input multiplexor 123 allows the node to receive its own signal. This internal connection means that the node can self-test its clock encoder and decoder before attempting to insert itself into the ring. Furthermore, while Bypassed, the node is able to listen to either link-pair in order to attain synchronisation prior to entering the ring. As each link of each link pair 14, 15, is implemented as a twisted pair, Differential line drivers 125, 126 and line receivers 124, 127 are employed to interface the Bypass Control Circuit 94 to the respective links.

Referring to FIG. 2.1, the Terminal Interface Unit (TIU) 13 design provides three ports for user access to the node: a four-wire voice port 131, a parallel data port 132, and a serial data port 133. The voice port 131 includes a Speech Activity Detector (SAD) 134 (for speech interpolation), an Intel 2911A PCM codec 135, for voice digitization and a Speech Line Interface Circuit (SLIC) 136 to interface to the telephone handset. Connection of the voice port to the NIU system bus 146 is by way of a pair of (PIAs) peripheral Interface Adaptors 137. As previously discussed, the parallel data port supports high-rate data transfers (up to 1M bit/sec) using the IEEE-488 standard. Connection of terminal equipment 142 to the NIU is through a General Purpose Interface Adaptor (GPIA) 139 and a set of line transceivers 141. The serial data port uses the V.24 standard to support data rates up to 19.2K bit/sec. NIU connection is via an Asynchronous Communications Interface Adaptor (ACIA) 143 and line transceivers 144.

In a Motorola, preferably an electromechanical bypassing relay will also be provided within the line socket connecting the LIU with the ring cable, to bypass the node (independently of the Bypass Control circuit on the LIU) if either the node's power fails, or if the node is unplugged from the ring.

The cyclic service scheme incorporated in the system described herein allocates the system's capacity between voice and data applications on a demand basis. This results in reduced voice loss and improved data delay characteristics. The service scheme maintains a fixed time relationship between voice packets, effectively eliminating delay variance and the effects of temporal distortion of talkspurts. Echo problems, which can arise on calls to parties within the PSTN, are overcome by nesting short service cycles within the network cycle. By this means, the small echo-path delay results in satisfactory echo performance.

In operation, the cyclic service scheme does not necessitate the use of either pre-assigned or fixed duration timeslots. Hence, speech interpolation and variable length data packets are accommodated. Speech interpolation effectively doubles the system's voice capacity, while variable packet lengths further reduce data delay and increase the effective data capacity.

The switch architecture is based on the decentralised use of autonomous switching nodes to enhance fault tolerance. This architecture lends itself to geographic distribution of the switching functions (such as the PABX service), resulting in simplified cable installation and ease of system expansion, and overall system ruggedness. Network administration and maintenance is facilitated with the provision of specialised network functions such as Network Administration and Network Supervision.

The protocol architecture conforms to the OSI reference model and provides a reliable and efficient connection-less network service which is common to all applications. Those applications requiring a connection-oriented service (typically data applications) provide the additional flow and sequence mechanisms using a connection-oriented transport protocol. Within the network service, integration of voice and data takes place at the earliest opportunity—the medium access level—to maximise the advantages of service integration, including integrated customer access providing ISDN compatibility.

The described uses micro-processor based nodes having a "dual-processor"-like structure for efficient data transfer and processing. Mutual synchronisation of the nodes on the ring is provided in order to eliminate the need for a master clock node. This is in keeping with the decentralisation of functions and control which is one of the characteristics of embodiments of the present invention.

The integrated switching and transmission of mixed traffic applications by means of a decentralised packet switch potentially offers many advantages over more traditional approaches such as augmenting a PABX with a separate LAN.

Referring now to FIGS. 22–28 a mathematical model of a LAN according to the presentation will be presented. Consider the LAN as being a (decentralised) switch composed of a number of communication nodes to which user devices are connected. A node is capable of producing packets from synchronous sources (generically called Voice), or from non-synchronous sources (called Data). A method of decomposition is employed whereby the offered traffic from these two classes is represented as a Voice queue 151 and a Data queue 152, as shown in FIG. 22, with network service 153 being cycled between the queues.

While the potential voice population is large, the number of active voice sources contributing to the voice queue is limited by a Voice Admission Policy. The resulting blocking probability is closely approximated by the Erlang Loss equation, which is discussed in more detail later. A decentralised implementation of the voice admission policy will also be discussed later.

Voice and Data packets arriving at the network are separately queued for service. The LAN server 153 (a rotating Token) alternately gives service to the two queues 151 and 152. Periodically, the LAN serves only the Voice Queue 151; the Data Queue 152 is serviced for the remaining time. The service principle is depicted in FIG. 23.

If time is conceptually "slotted" into units equal to the service time of an individual voice packet, then the total network capacity is N slots per cycle if N voice sources can be served in a given cycle. In cycle i, the first $n_i$ of the N slots are used by voice, N-$n_i$ slots remain for use by data. The service discipline is, therefore, such that voice is given non-pre-emptive priority of service over data each cycle. Contention between sources is handled on a loss basis for voice, and on a delay basis for data. This means that if excess voice packets are queued during a cycle, the excess is lost. However, if excess data packets exist, the excess is held over to the next cycle.

The boundary between voice and data service can be a Static Boundary (SB), or a Dynamic Boundary (DB). With SB, L slots are assigned to voice each cycle, and the remaining N-L are assigned to data. For DB, on average L slots are used by voice, but the instantaneous number of voice slots will fluctuate.

In the model described herein a number of implicit assumptions have been made. These assumptions are given below, which some key nomendature is given in Table 2.

(1) A voice source may be Active (if engaged in a call), or else it is idle ("on-hook"). At busy hour there will be at most S sources active, or else Blocked. Blocking occurs when the number of active sources Si reaches the limit S.

(3) Calls have a Holding Time $1/\mu$ and an interarrival time $1/\lambda$. Each unblocked source generates calls independently of other sources.

(4) Active sources alternate between Talkspurt and Silence. The probability of a source being a talkspurt is $\alpha$, the Talker Activity. Talkspurts are generated by active sources independently of other sources.

(5) A Talkspurt produces exactly one packet per cycle, with $$T = L_v/R \text{ seconds} \qquad (4)$$

where T is the cycle duration, Lv is the number of bits in a voice packet (excluding header), and R is the voice encoding rate. The cycle duration is small compared with the talkspurt duration and, hence, a talkspurt extends over many cycles.

A Silence produces no packets.

(6) Data sources produce an aggregate packet rate of $\lambda_D$ packets per second, the arrival process being Poisson. The sources generate packets independently of other sources, with packet length $L_D$.

(7) The system is capable of carrying the equivalent of N voice packets per cycle, giving a total capacity of N slots per cycle.

(8) In each cycle voice packets are serviced ahead of data. A voice packet arriving during a cycle is placed into the first free slot of the next cycle. If no free slots exist, the packet is flushed from the voice queue and is lost to the system.

TABLE 2

| | List of Key Symbols |
|---|---|
| N | System Capacity ("slots" per cycle) |
| $n_i$ | Slots used by voice in cycle i |
| L | Slots used by voice under static boundary |
| M | Maximum number of slots available for voice; |
| T | Cycle Duration |
| S | Maximum voice poplulation size |
| $1/\mu$ | Call holding time |
| $1/\lambda$ | Call interarrival time |
| $\alpha$ | Talker Activity |
| $L_v$ | Length of voice packet (excluding header) |
| R | Voice encoding rate |
| $\lambda_D$ | Data packet arrival rate |
| $L_D$ | Data packet length |
| $a_i$ | voice utilisation in cycle i |
| $X_i$ | Data service time in cycle i |
| $\beta$ | Waiting time advantage |
| $\omega$ | Mean data waiting time |
| $\rho$ | Data traffic intensity |
| K | Number of nodes on ring (unbypassed) |
| $v$ | Speed of signal propagation |
| $l_i$ | Length of the i th node |
| C | System transmission rate |

Referring now to the Voice Blocking Probability for the model, an Idle voice source is Blocked when the number of Active sources reaches a limit S. The number of sources active in each cycle is determined by the voice admission policy in relation to the grade of service at busy hour.

Calls are generated independently by each source at a rate $\lambda$. Hence, if T is a sufficiently small interval of time, the probability that a call is generated during a cycle of duration T is $\lambda T$. Similarly, the probability that a call will terminate during next cycle is $\mu T$. If there are $\kappa$ calls in progress the probability of a call terminating is $\kappa\mu T$.

By denoting the system having $\kappa$ calls as being in "state $\kappa$", the probability of moving from state $\kappa$ to $\kappa+1$ in time T is $$P_{\kappa,\kappa+1}(T) = \lambda T \qquad (5)$$

and the probability of moving to state $\kappa-1$ from state $\lambda$ is $$P_{\kappa,\kappa-1}(T) = \kappa\mu T \qquad (6)$$

The state transition diagram resulting from eqns (B.1) and (B.2) is shown in FIG. 24 from which the probability of finding the system in state $\kappa$ is $$P_\kappa = \frac{(\lambda/\mu)^\kappa}{\kappa!} P_0; \kappa = 0,1,\ldots S \qquad (7)$$

and, hence, the probability of blocking, Ps, is $$P_M = E_B = \frac{(\lambda/\mu)^s/s!}{\sum_{i=0}^{s} (\lambda/\mu)^i/i!} \qquad (8)$$

which is the Erlang-B loss equation denoted $E_B$.

In deriving $E_B$ it was assumed that T is a "sufficiently small interval of time. In particular, it is required that $T \ll 1/\kappa\mu$. Since t is of the order of 10 ms, and the call holding time $1/\mu$ would typically be a few minutes, the assumption is satisfied provided the number of calls in progress is small compared with 10,000 (say less than 1,000).

Voice Packet Loss will now be calculated for the cyclic service model, using elements of traffic theory. It will also be shown that voice loss is reduced for a dynamic service boundary compared with that resulting from a static boundary.

If we let S denote the number of active voice sources during busy hour, then during any cycle, i, there are $S_I$ ($S_I \leq S$) sources in talkspurt, and $S$-$S_I$ in silence. The probability of a source being in talkspurt is $\alpha$, the Talker Activity; the probability of being in silence is therefore $1$-$\alpha$.

Given that $S_I$ sources are in talkspurt, the probability of moving to state $S_I$ is $\alpha(S$-$S_I)$, while the probability of moving to state $S_I$-$1$ is $(1$-$\alpha)S_I$. The corresponding state transition as shown in FIG. 25.

From FIG. 25, the probability that the system is in state j (that is, that $S_I$=j) is $$P(S, j) = \frac{{}^SC_j\left[\frac{\alpha}{1-\alpha}\right]^j}{\sum_{i=0}^{S} {}^SC_i\left[\frac{\alpha}{1-\alpha}\right]^i} \; ; \; i, j = 0 \ldots S \text{ since} \quad (9)$$

$$\sum_{i=0}^{S} {}^SC_j\left[\frac{\alpha}{1-\alpha}\right]^j = (1-\alpha)^S$$

$i = 0$ then equation (9) becomes $P(S, j) = {}^SC_j\alpha^j(1-\alpha)^{S-j}$ (10)

The number of sources in talkspurt is therefore binomially distributed.

The offered voice traffice is the expectation of $S_j$. Hence the, offered voice traffic is given by $$A = \alpha S \text{ packets/cycle} \quad (11)$$

While for Carrier Voice Traffic, if we let M be the maximum number of slots available for voice traffic during each cycle, then the voice traffic carried by the system will be given by $$Y = \sum_{i=0}^{M} i P_i + M \sum_{i=M+1}^{S} P_i = A(1-B) \quad (12)$$

The quantity M is actually a function of the boundary scheme employed by the system, such that for a static boundary $M=L$, while $M=N$ for a dynamic boundary.

The carried traffic is less than the offered traffic by the factor (1-B), where B is the voice packet loss, or "talkspurt congestion". This is analogous to the "freeze out fraction" encountered in the TASI system (Refer to Ref 27).

From eqn (12), the voice packet loss can be written as $$B = B(S, M) = \frac{1}{\alpha S} \sum_{j=M+1}^{S} (j - M) \, {}^SC_j\alpha^j(1-\alpha)^{Sj} \quad (13)$$

Equation (13) has been veritifed by Weinstein, C. J., (see Ref 35), who has shown that the "freeze-out" produced by a multiplexer employing Speech Interpolation was found to have the same numerical value as the voice packet loss given by eqn (13).

Provided that S is large and $\alpha \approx 0.5$, the DeMoirve-Laplace Theorem (Refer to Ref 36) can be applied to yield the following asymptotic approximation of the voice packet loss.

$$B = \left[\frac{1-\alpha}{2\pi\alpha S}\right]^{\frac{1}{2}} \cdot \exp(-yM^2/2) + \quad (14)$$

$$\frac{\alpha S - M}{\tau}[Q(y(M)) - Q(y(S))]$$

$$y(x) = \frac{x + 1 - \alpha S}{\sqrt{(\alpha S(1-\alpha))}} \quad (15)$$

$$Q(y) = \frac{1}{(\sqrt{2\pi})} \int_y^\infty \exp(-x^2/2)dx$$

The voice packet loss for a system with a voice capacity of 12 and talker activity of 0.45 is shown in figure C.2. From this graph it can be seen that as many as 20 voice sources may be active with a loss of less than one percent. Without speech interpolation (equivalent to a talker activity of unity), the same system would support only 12 sources.

If the system capacity is N slots per cycle, of which L slots are reseved for voice by means of a static boundary, the voice packet loss is given by eqn (C.5) wit $M=L$, that is $$B_{sb} = B(S,L) \quad (16)$$

However, if the boundary is allowed to move, so that voice may temporarily make use of some of the slots normally used by data, then $M=N$ and the voice loss probability becomes $$B_{db} = B(S,N) \quad (17)$$

Taking as a specific example a system with capacity of 15, of which 80% is assigned as voice capacity (giving $L=12$), the resulting voice loss for both static (SB) and dynamic (DB) boundaries is compared in FIG. 26. As this example shows, the dynamic boundary considerably reduces (by almost an order of magnitude) the probability of voice loss.

The purpose of the voice admission policy is to restrict the voice population size to some value S and it has been shown that this results in an Erlang blocking probability. An algorithm will now be devised which allows the nodes of the system to admit new voice calls while the voice population is less than S. Furthermore, the algorithm can be implemented on a decentralised basis, without explicit knowledge of time dependent parameters, such as talker activity $\alpha$.

It has been shown previously that the number of talkspurts in the system is binomially destributed. Thus, if there are $S_o$ active voice sources, the expected number of talkspurts is $$n = \alpha S_0 \quad (18)$$

while the variance is $$\sigma_n^2 = \alpha S_0(1-\alpha) \quad (19)$$

Hence, the voice population size can be determined using the relation $$S_0 = \frac{\bar{n}^2}{\bar{n}^2 - \sigma_n^2} \text{ since } \sigma_n^2 = \overline{n^2} - \bar{n}^2 \quad (20)$$

It should be noted that eqn (20) allows the voice population size to be determined by the nodes given only the a knowledge of n and $n^2$. In particular, no knowledge of $\alpha$ is required. This is desirable since $\alpha$ is a talker dependent statistic which is, in all likelihood, time varying.

During each cycle, the nodes are able to count the number of voice packets carried by the system, $n_i$. Given that the voice packet loss is small, the number of packets carried very nearly equals the number of talkspurts in the system. Hence, n can be approximated by the sample mean of $n_i$ which, if calculated over N cycles (here N is not meant to represent the network capacity) is given by $$\bar{n}_N = \frac{1}{N} \sum_{j=1}^{N} n_j \quad (21)$$

or, as the recursion relation $$\bar{n}_N = \frac{1}{N} \cdot n_N + \left[\frac{N-1}{N}\right] \cdot \bar{n}_{N-1} \quad (22)$$

Since the sample mean must be updated over an indefinite number of cycles, it is desirable to use a running average, or moving window, estimate of n. By analogy with eqn (D.5), we have $$n_i = (1-\gamma)n_i + \gamma n_{i-1} \quad (23)$$

where $\gamma$ determines the window size and is related to the sample size by $$\gamma = \frac{N-1}{N} \quad (24)$$

Sampling theory guarantees that the sample mean is a good estimate of n provided the sample size is greater than about 30 (Refer to Ref. 37). For example if there are currently 10 active voice sources on the system, with an activity of 0.4, then a sample size of 37 is required for a 95% confidence in the estimate of n. Hence $\gamma$ should be about 0.97. Following Drago (Refer to Ref 24), $\gamma$ can be written as $1-\frac{1}{2}^m$ where m equals 5 (for $\gamma=0.97$). This allows the running average estimate of n to be implemented without multiplication thereby resulting in little processing burden on the nodes.

In order to determine the voice population size $S_o$ according to eqn (D.3), the nodes also need the second moment of the talkspurt number $n^2$. As an estimate, the second sample moment can be used, given by $$\bar{n}_i^2 = (1-\gamma)n_i^2 + \gamma \bar{n}_{i-1n}^2 \quad (25)$$

Using eqns (20), (23) and (25), the voice population size can be estimated, by each node in the system, with the relation $$S_0 \simeq \frac{\bar{n}_i^2}{\bar{n}_i - \bar{n}_i^2 + \bar{n}_i^2} \quad (26)$$

given that $\gamma$, in eqns (23) and (25), in close to unity.

It should be noted that a node does not need to evaluate eqn (26) each cycle, but only when the node's voice user attempts to initite a new call. At that time, the node, using its values of $n_i$ and $n_i^2$, determines the current voice, population size, $S_o$, using eqn (26). If less than S, the new voice call can be admitted.

The expected delay imposed on data will now be derived, from which it will be shown that the delay is reduced if a dynamic boundary scheme is employed, compared with the static boundary scheme.

Under the cyclic service model, the service given to the data queue is interrupted periodically in order to service the voice queue. The portion of cycle i spent serving the data queue during cycle i is $$d_i = 1 - a_i \quad (27)$$

where $a_I = n_i/N$ is the voice utilisation in packets per cycle. Under these conditions, it has been observed (Refer to ref 2) that such a system has a similar behaviour to one in which the service is not interrupted, but whose capacity is reduced by $d_I$. This, together with assumption 6, suggest the use of an M/G/1 queuing model in which the serivce rate is appropriately reduced.

The data packet service time is given by $$X_i = \frac{L_D}{d_i C} \quad (28)$$

where $L_D$ is the data packet length, with first and second moments $L_D$ and $L_D^2$, and $d_iC$ is the effective network capacity available for serving data in cycle i. We proceed by establishing the first and second moments of the service time which can then be applied to the Pollaczek-Khinchine formula (Refer to Ref 38) to yield the expected data waiting time.

$$\omega = \frac{\lambda_D \cdot \overline{X^2}}{2(1-\lambda_D)\overline{X}} \quad (29)$$

Consider first a static boundary scheme in which L slots per cycle are reserved for voice. In this case, $n_i = L$ for all cycles giving the first two moments of $d_iC$ as $$E[d_iC]_{sb} = (1-a)C \quad (30)$$

$$E[(d_iC)^2]_{sb} = (1-a)^2 C^2 \quad (31)$$

where the average voice utilisation is $a = L/N$.

Now consider a dynamic boundary in which the expected number of talkspurts per cycle equals L. Given that the carried traffic very nearly equals the offered traffic, the expectation of $d_iC$ is the same as that for the static boundary given by eqn (30), while the second moment of $d_iC$ can be written as $$E[(d_iC)^2] = C^2 E[(1-a_i)^2] \quad (32)$$

Since $E(X^2) = V(X) + E(X)^2$ where X is a random variable, we have $$E[(1-a_i)^2] = V[1-a_i] + E[1-a_i]^2 \quad (33)$$

However, adding a constant to a random variable doesn't affect its variance. Thus, the first term of eqn (33) becomes $$V[1-a_i] = V[n_i]/N^2 \quad (34)$$

which, owing to the binominal nature of $n_i$, can be written as $$V[1-a_i] = \frac{a}{N}(1-a) \quad (35)$$

The second term of eqn (E.6) can be immediately written as $$E[1-a_i]^2 = (1-a)^2 \quad (36)$$

Therefore, the first two moments of $d_IC$ for a dynamic boundary are given by $$E[d_iC]_{db} = (1-a)C \quad (37)$$

$$E[(d_iC)^2]_{db} = [(1-a)^2 + (1-a)a/N] C^2 \qquad (38)$$

For either boundary type, the mean data service time can be written, using eqn (28), as $$\overline{X} = \frac{L_D}{(1-a)C} \qquad (39)$$

While the second moment of service time for the static boundary is $$\overline{X}_{sb}^2 = \frac{L^2{}_D}{(1-a)^2 C^2} \qquad (40)$$

and for the dynamic boundary $$\overline{X}_{db}^2 = \frac{L^2{}_D}{[(1-a)^2 + (1-)a/N]C^2} \qquad (41)$$

As shown by eqn (29), the waiting time is directly proportional to the second moment of the service time. Comparing (40) with (41), the dynamic boundary is seen to yield a smaller second moment than the static boundary. Writing $$\frac{\overline{X}_{sb}^2}{\overline{X}_{db}^2} = 1 + \beta \qquad (42)$$

where $\beta$ is the fractional difference between the two moments, or the "waiting time advantage" of the dynamic boundary over the static boundary. Then $\beta$ can be expressed as $$\beta = \frac{a/N(1-a)}{(1-a)^2} \qquad (43)$$

Thus, $\beta$ is positive definite which means that the static boundary leads to a larger second moment of service time (and, hence, waiting time) than the dynamic boundary. Furthermore, eqn (43) has a double pole at $a=1$ which implies that the static boundary becomes rapidly worse as more of the cycle is used by voice.

Applying eqn (29), the expected waiting time of a data packet is found to be $$\omega = \frac{\lambda_D^2 \cdot \overline{X}^2}{2(1-\lambda_D)\overline{X}} \qquad (44)$$

where $\lambda_D$ is the data packet arrival rate, and $(X, X^2)$ are given by (39) to (40).

Data transfer time $T_f$ is defined as the time from the arrival of a packet at the data queue, to its subsequent delivery by the network and has three components, $$T_f = \overline{X} + \overline{\omega} + T_A \qquad (45)$$

where $T_A$ is the access delay and represents the overhead associated with passing the token around the ring. From Bux (Refer to Ref 13), this token passig delay is found to be $$T_A = \frac{T_w(1-\rho/K)}{2(1-\rho)} + \frac{T_w}{2} \qquad (46)$$

given that $\rho = \lambda_D X$ is the utilisation of the data service subcycle, $T_w$ is the ring walk time, and K is the number of nodes involved in passing the token.

Hence, with (45) and (46), the transfer time becomes $$T_f = \overline{X} + \frac{\rho \overline{X}^2/\overline{X} + T_w(1-\rho/K)}{2(1-\rho)} + \frac{T_w}{2} \qquad (47)$$

The transfer time given by (47) is plotted in FIG. 27. The three different schemes: fixed boundary (SB), dynamic boundary (DB), and no boundary (NB) will now be compared. For SB and DB, the voice utilisation fraction, a, is taken to be 0.8, and the system bandwidth is 1M bit/sec. The NB scheme is an equivalent system with no voice load and a bandwidth of 200 K bit/sec. Hence, in all three cases, the effective capacity for data $E(d_iC)$ is 200 K bit/sec.

As shown in FIG. 27, both schemes employing cyclic service integration (SB and DB) give a smaller delay than the NB case. This can be attributed to the access delay which, in the case of token passing, for example, is proportional to the walk time. This is, in turn, a decreasing function of the ring's transmission rate. Since the NB scheme uses a lower absolute transmission rate than either of the cyclic schemes, the overall transfer time is the highest of the three cases.

The effect of the dynamic boundary is also seen in FIG. 27. The delay due to DB is less than that of SB for all data utilisations and becomes significantly better at higher loads. To see what this means in practice, if we wished to limit the transfer time to some value (say 3.5 service time units), the DB scheme would allow a 10% greater data load to be carried than would SB.

The total network capacity N is defined as the number of voice packets that the network is capable of serving in each cycle.

The propagation delay associated wit node, i, denoted $k_i$, is given by $$k_i = \frac{h_i}{C} + \frac{l_i}{v} \text{ secs} \qquad (48)$$

where $h_i$ is the latency of node i (bits), C is the system transmission rate (bits/sec), $l_i$ is the length of the link between node i and node i+1 (meters), and v is the speed of signal propagation along the cable (meters/sec). The Token Walk Time $T_x$ is defined as the total propagation delay around the ring.

$$T_x = \sum_{i=0}^{K} k_i = Kk \text{ secs} \qquad (49)$$

where K is the number of nodes on the ring and $\kappa$ is the average nodal delay.

Now, considering Token Rotation Time $T_R$, the token proceeds around the ring by being passed from one node to the next. The time taken for the token to be passed by a node depends on whether or not the node has a packet to transmit when visited by the token. If it has not, then the token delay is simply $\kappa$, the nodal delay. However, if a packet is transmitted, the token delay is given by $$T_D = \kappa + m(K) \qquad (50)$$

where m(K) is a function of the mode of token operation. Consider the three modes defined by Bux (Refer to Ref 13): single-packet, single-token, and multiple-token.

If single-packet is used, a node does not release the token until its own packet has fully returned from around the ring. Using single-token operation, a node may release the token when its packet first begins to return, provided the packet transmission has been completed by that stage. Finally, a node releases the token immediately the packet transmission ends if multiple-token operation is employed.

In terms of these three models m(κ) may be written as $$m(K) = \begin{array}{l} T_p + T_s; \text{ single-packet} \\ \max(T_p, T_s); \text{ single-token} \\ T_p; \text{ multiple-token} \end{array} \quad (51)$$

with $T_p$ being the packet transmission time.

The Token Rotation Time $T_R$ is defined as the time taken for the token to service all K nodes involved in token passing, and is given by $$T_R = K[\tau_K + q \cdot m(K)] \text{ secs} \quad (52)$$

where q is the probability that a node transmits a packet when visited by the token.

The Network Capacity N is defined such that the system operates at capacity if the token takes T secs (the cycle duration) to rotate once around the K nodes. Therefore, using (52), the network capacity can be written as $$N = \frac{T - T_s}{m(K)} \text{ packets/cycle} \quad (53)$$

which can be rewritten as $$N = \eta_t M_p \frac{C}{V} \left(1 - \frac{T_\omega}{T}\right) \text{ packets per cycle} \quad (54)$$

where $\eta_t = T_p/m(K)$ is the transmission efficiency, and $M_p = L_{vv}/(L_v + L_M)$ is the packetisation efficiency, given that $L_v$ is the length of a voice packet excluding the header. Clearly, as the total ring latency (the walk time) increases, the network capacity is reduced. This effect is independent of the mode of operation which is separately accounted for by $\eta_t$. However, for the applications of interest for the LAN, it is generally true that $T >> T\omega$ and eqn (54) can be approximated by $$N \simeq \eta_t M_p \frac{C}{V} \text{ packets/cycle} \quad (55)$$

As an example, consider a system which employs multiple-token operation at 1M bit/sec, using 64 K bit/sec PCM to encode the speech into packets containing 16 ms voice segments with 5 byte headers.

In this system, each packet contains $L_p = 1024$ bits in addition to the header of $L_M = 5 \times 8 = 40$ bits. Hence, the packetisation efficiency is 0.96. Since multiple token operation is employed, the propagation efficiency is unity. Thus, using eqn (55), the total network capacity is $N = 0.96 \times 10^6/64,000 = 15$ voice packets/cycle.

10. References

[1] Gitman, I., et al, "Economic Analysis of Integrated Voice and Data Networks: A case Study", IEEE Trans. Comms, COM-66, November 1978, p.1549.

[2] Ross, M., et al, "Performance Analysis of Hybrid Switching Concepts for Integrated Voice/Data Communications", IEEE Trans Comms, COM-30,5, May, 1982, p.11073.

[3] Clark, D., et al, "An Introduction to Local Area Networks", Proc. IEEE 66, Nov. 11, 1978, p.1497.

[4] Ulm, J. "A Timed Token Ring Local Area Network and its Performance Characteristics", IEEE The Conf. on Loc. Comp. Nat., October 1982, p.50.

[5] Gordon, R., "Ringnet: A Packet Switched Local Nettwork with Decentralised Control", IEEE 4th Conf. on LAN, October 1979, p.13.

[6] Proteon Associates, "Operation and Maintenance Manual for the ProNET Model p1000 Unibus Local Network System", Waltham, MA, June, 1983.

[7] Project 802, "Draft IEEE Standards 802.4: Token Bus Access Method and Physical Layer Specifications", December 1982.

[8] IEEE Project 802, "Draft IEEE Standard 802.5: Token Ring Access Method and Physical Layer Specifications", Apr. 11, 1983.

[9] Seidl, R., et al, "Voice Services on a Token Ring LAN", Telecom Aust., paper No. 65, June, 1984.

[10] Higgins, A. W. F., "Effects of Lost Packets on Speech Intelligibility", NSC Note 78, 1976.

[11] Jayant, N. S., et al, "Effects of Packet Losses in Waveform Coded Speech and Improvements Due to an Odd-Even Sample Interpolation Procedure:, IEEE Trans. Coms, COM-29, Feb. 2, 1981, p. 101.

[12] Anido, G. J. "Voice Communication on Local Area Networks", Uni. N.S.W., Undergraduate Thesis Dissertation, Nov. 1983. (Unpublished).

[13] Bux, W., "Local Area Subnetworks: A Performance Comparison:, IEEE Trans Comm, COMM-29, Oct. 10, 1981, p. 1465.

[14] Shock, J., et al, "Evolution of the Ethernet Local Computer Network", Computer, August, 1982, p. 10.

[15] Herman, M., "LAN controller regulates token passing traffic", Electronic Design, Dec. 1983, p. 139.

[16] Tobagi, F. A. et al, "The EXPRESSNET: a Local Area Communication Network Integrating Voice and Data", IEEE Comp. Soc., Compcon, Feb. 1982, p. 121.

[17] Limb, J. O., et al "Description of Fasnet—A Unidirectional Local—Area Communication Network", B.S.T.J. 61, 7, Sept, 1982, p. 1413.

[18] Salter, J. H., et al, "Why a Ring?", Computer Networks, 7, 1983, p. 223.

[19] IEEE Project 802, "Local Area Network Standard: Draft Standard P802.2 Logical Link Control", Nov, 1982.

[20] ISO, Draft Proposal 8473: Information Processing Systems—Data Communications—Protocol for providing the Connectionless Network Service", International Organisation for Standardisation, Geneva 1983.

[21] ISO, "Draft International Standard 8073: Information Processing Systems—Open Systems Interconnection—Transport Protocol Specifications", International Organisation for Standardisation, Geneva, 1983.

[22] Shepard, D., et al, "A gateway development system", Microprocessors and Microsystems, 6, 1, 1982, p. 21.
[23] Turner, K., "An Open Architecture for Local Area Networks", ICCC, Oct. 1984, p. 339.
[24] Dragon, P. G., et al "Digital Dynamic Speech Detectors", IEEE Trans. Comms., COM-26, 1, Jan. 1978, p. 140.
[25] Minoli, D., "Issues in Packet Voice Communications", Proc. IEE, 126, Aug. 1979, p. 729.
[26] Minoli, D., "Packetised Networks—1", Australian Electronics Engineering, April, 1979, p. 38.
[27] Billington, K., et al, "Engineering Aspects of TASI", B.S.T.J., March, 1959, p. 353.
[28] Budrikis, Z. L., et al, "A packet/circuit switch", B.S.T.J. to be published.
[29] Chaillet, B., et al, "Towards a Formal Approach for Baseband Local Area Networks Carrying Integrated Real Time and Data Traffic", Ring Technology Local Area Networks, IFIP, 1984, p. 187.
[30] Keller, H., "Transmission Design Criteria for a Synchronous Token Ring", IEEE, SAC-1, 5, Nov. 1983, p. 721.
[31] Stover, H. A. "Network Timing/Synchronisation for Defence Communications", IEEE Trans. Comm, COM-28, 8, Aug, 1980, p. 1234.
[32] Braun, W. R., "Short Term Frequency Instability Effects in Networks of Coupled Oscillators", IEEE Trans. Comm, COM-28, 8, Aug, 1980, p. 1269.
[33] Fowler, B., "Transmission Line Characteristics:, NSC Note 108, May 1974.
[34] Abbott, J., "Transmission Line Drivers and Receivers for EIA Standards RS-442 and RS-423", NSC Note 214, Oct, 1978.
[35] Weinstein, C. J., "Fractional Speech Loss and Talker Activity Model for TASI and for Packet-Switched Speech", IEEE Trans. Comm, COM-26, 8, Aug, 1978, p. 1253.
[36] Papoulis, A., "Probability, Random Variables, and Stochastic Processes", McGraw-Hill, Inc, 1965.
[37] Wadpole, R. E., et al, "Probability and Statistics for Engineers and Scientists", 2nd Ed., Macmillan Publishing Co., 1978.
[38] Tanenbaum, A. S., "Computer Networks", Prentice-Hall, 1981.

We claim:

1. A digital communications system comprising a plurality of stations connected in a ring topology for transmission of information in one direction around said ring, each station in turn initiating transmission of information which is waiting to transmit over the system in response to receipt of a token passed from station to station around the ring, said token being in the form of a unique digital code, and said communications system being adapted to carry at least two classes of information, each of which is assigned a priority ranking and at least one of which is synchronous information for which the transmitting station must be serviced periodically, said system including control means distributed throughout the system, such that each station within the system contributes equally to the control of the system, said distributed control means including system clock generation means, distributed token establishment and control means and distributed cycle control means, said cycle control means comprising a cycle clock in each station of the system to indicate the beginning of each new cycle to its respective station, the cycle clock of each station being kept in synchronization with the remainder of the cycle clocks by a synchronizing signal which is passed around the system at the beginning of each cycle, and each station operating under a protocol whereby a first pass of the token around the ring during a system cycle is used to transmit synchronous information of the highest priority ranking, while subsequent passes of the token around the ring are used to transmit any remaining information classes in order of priority ranking, the time taken for each pass of the token around the ring being dependant upon the number of stations having information of the respective class queued for transmission.

2. The system according to claim 1 wherein long and short system transmission cycles are provided, the short cycles being embedded in the long cycles, such that the period for service of the highest priority information classes is determined by the short cycle length and the period for service of the remainder of the information classes is determined by the long cycle period, and each station having two cycle clocks, one for timing the short cycles and the other for timing the long cycles.

3. The system according to claim 2 wherein the short cycle period is in the order of 4 ms and the long cycle period is in the order of 16 ms.

4. The system according to claim 3 wherein digitized voice information is packetised into packets of on the order of 256 bits when transmitted by stations at the rate of one packet per short cycle and is packetised into packets of on the order of 1024 bits when transmitted at the rate of one packet per long cycle.

5. The system according to claim 2 wherein additional system transmission cycles other than said long and short cycles are provided, having cycle lengths greater than said short cycle and shorter than said long cycle, these additional cycles being embedded within the long cycles and each additional cycle being associated with a particular class of information for which the service period is determined by the respective additional cystem cycle and each station having one additional cycle clock for each additional cycle type.

6. The system according to claim 1 wherein speech interpolation is employed to reduce the bandwidth required per speech channel.

7. The system according claim 1 wherein transmission of information between stations is by way of a self clocking line code.

8. The system according to claim 1 wherein the ring topology is in the form of a double ring, wherein forward and reverse links are provided between each pair of adjacent nodes, such that in the event of failure of a link between two adjacent nodes, or failure of a node, the reverse links of the ring can be employed to form an alternative path around the failed link or node.

9. The system according to claim 8 wherein the reverse links are normally used to carry a clock synchronising signal.

10. The system according to claim 9 wherein the clocks of adjacent nodes are maintained mutually synchronised by way of signals transmitted over the respective forward and reverse links.

11. The communication system of claim 1 wherein each station is adapted to originate the synchronizing signal when it receives a token after the beginning of a new cycle whithout first receiving the synchronizing signal, the synchronizing signal comprising a cycle poll which includes a cycle clock time field.

12. The communication system of claim 11 wherein each station is adapted to originate a cycle depoll signal, the cycle depoll signal being generated only by the station which originated the cycle poll cycle for the current cycle, and the cycle depoll signal being originated when the respective station receives the token after the token has passed around the ring once, thereby indicating the end of synchronous data service for that cycle.

13. The system as claimed in claim 1 wherein each station includes synchronous data admission control means whereby admission of a station to commence transmission of synchronous data on the system is allowed only when the number of stations transmitting synchronous data ($S_o$) is less than the system capacity for synchronous data transmission (S), the value of $S_o$ being established by each station independently by counting the number of synchronous data pocket transmissions during respective cycles and performing calculations to statistically estimate the number of stations currently transmitting synchronous data.

14. The system as claimed in claim 13, wherein the equation:

$$S_o = \frac{\overline{n_i^2}}{\overline{n_i} - \overline{n_i^2} + \overline{n_i^2}}$$

is used to estimate $S_o$, where $n_i$ the number of synchronous data packets transmitted in cycle number i.

15. The system according to claim 1 wherein one station in the system acts as a gateway to another network and wherein long and short system transmission cycles are provided, the short cycles being embedded in the long cycles, such that the period for service of the highest priority information class is determined by the long cycle, each station having two cycle clocks, one for timing the short cycles and the other for timing the long cycles and being adapted to transmit two classes of synchronous data, the first class being said highest priority information class and having its period for service determined by the short cycle, and the second synchronous class of data comprising data having a destination within the ring and having its period for service determined by the long cycle period.

16. A method of transmitting information between stations of a digital communications system comprising a plurality of nodes connected in a ring topology for transmission of information in one direction around said ring, wherein each station is in turn given access to initiate transmission of information over the system by receiving a token which is passed from station to station around the ring, said token being in the form of a unique digital code, and said communications system being adapted to carry at least two classes of information, each of which is assigned to priority ranking and at least one of which is synchronous information for which the transmitting station must be serviced periodically, said system including control means distributed throughout the system, such that each station within the system contributes equally to the control of the system, said distributed control means including system clock generation means, distributed token establishment and control means and distributed cycle control means, said cycle control means comprising a cycle clock in each station of the system to indicate the beginning of each new cycle to its respective station, and said method comprising the steps of:

circulating a cycle clock synchronizing signal, comprising a cycle poll signal containing a time field, at the beginning of each cycle, wherein said cycle poll signal is initiated by the first station to receive a token after the beginning of a respective cycle and the synchronizing signal being used by each station in turn to synchronize its cycle clock;

circulating the token around the system for a first time, whereby each station may transmit, upon receipt of the token, any synchronous data which it has queued for transmission;

circulating a cycle depoll signal indicating the end of the synchronous data transmission service for the respective cycle, the cycle depoll signal being initiated by the station upon receipt of the token after its first circuit of the system; and recirculating the token around the system whereby each station may transmit, upon receipt of the token, any non-synchronous data which it has queued for transmission, circulation of the token after the cycle depoll continuing until the next cycle poll signal is initiated.

17. The method as claimed in claim 16, wherein each station performs a synchronous data admission control procedure before commencing the transmission of synchronous data on the system, said procedure comprising the steps of:

determining the number of stations currently transmitting synchronous data ($S_o$) by counting the number of synchronous data packet transmissions during respective cycles, performing calculations to statistically estimate the number of stations currently transmitting synchronous data, and commencing transmission of synchronous data only if the value of $S_o$ is less than the system capacity for synchronous data transmission (s).

18. The method as claimed in claim 17, wherein the equation:

$$S_o = \frac{\overline{n_i^2}}{\overline{n_i} - \overline{n_i^2} + \overline{n_i^2}}$$

is used to estimate $S_o$, wherein $n_i$ is the number of synchronous data packets transmitted in cycle number i.

19. The method according to claim 16 wherein the communication system supports two transmission cycles of the differing lengths, the second cycle being shorter than the first and being embedded within the first cycle, and the system being adapted to transmit two types of synchronous data one being of higher priority than the other and having its period for service determined by the second cycle and the other having its period for service determined by the first cycle, said method comprising the steps of:

initiating a short cycle poll signal at the beginning of each short cycle, said short cycle poll signal causing the transmission of data in the current long cycle to be interrupted while synchronous data of the higher priority type is transmitted, and once the token has completed and circuits of the system to complete the short cycle, initiating a short cycle depoll to cause transmission of data in the current long cycle to be resumed.

* * * * *